(12) United States Patent
Golsch

(10) Patent No.: US 10,654,446 B2
(45) Date of Patent: *May 19, 2020

(54) LOCALIZATION AND PASSIVE ENTRY/PASSIVE START SYSTEMS AND METHODS FOR VEHICLES

(71) Applicants: DENSO International America, Inc., Southfield, MI (US); DENSO CORPORATION, Kariya, Aichi-pref. (JP)

(72) Inventor: Kyle Golsch, Pontiac, MI (US)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/411,810

(22) Filed: May 14, 2019

(65) Prior Publication Data
US 2019/0263357 A1 Aug. 29, 2019

Related U.S. Application Data

(63) Continuation of application No. 15/730,302, filed on Oct. 11, 2017, now Pat. No. 10,328,899.
(Continued)

(51) Int. Cl.
*B60R 25/24* (2013.01)
*B60R 25/20* (2013.01)
(Continued)

(52) U.S. Cl.
CPC .............. *B60R 25/24* (2013.01); *B60R 25/20* (2013.01); *B60R 25/2018* (2013.01);
(Continued)

(58) Field of Classification Search
CPC ........ B60R 2325/101; B60R 2325/205; B60R 25/20; B60R 25/2018; B60R 25/24;
(Continued)

(56) References Cited

U.S. PATENT DOCUMENTS 6,804,525 B2 10/2004 Davis et al.
7,027,772 B2 4/2006 Chen et al.
(Continued)

FOREIGN PATENT DOCUMENTS

BR 102014017465 A2 2/2016
CN 104574593 A 4/2015
(Continued)

OTHER PUBLICATIONS

U.S. Appl. No. 16/411,749, filed May 14, 2019, Golsch et al.
(Continued)

*Primary Examiner* — Sisay Yacob
(74) *Attorney, Agent, or Firm* — Harness, Dickey & Pierce, P.L.C.

(57) ABSTRACT

Systems and methods for localization and passive entry/passive start (PEPS) systems for vehicles are provided. A communication gateway establishes a wireless communication link with a portable device. Sensors communicate with the communication gateway, receive connection information about the wireless communication link, and measure signal information of communication signals transmitting communication packets sent from the portable device to the communication gateway via the wireless communication link. A localization module determines a location of the portable device based on the signal information from the sensors. A PEPS system receives performs a vehicle function including unlocking a door of the vehicle, unlocking a trunk of the vehicle, or allowing the vehicle to be started based on the location of the portable device. A security module compares (Continued)

first data in the communication packets received by the communication gateway with second data in the communication packets received by the plurality of sensors.

28 Claims, 18 Drawing Sheets

Related U.S. Application Data

(60) Provisional application No. 62/450,235, filed on Jan. 25, 2017, provisional application No. 62/407,190, filed on Oct. 12, 2016.

(51) Int. Cl.

| | |
|---|---|
| *B60W 10/08* | (2006.01) |
| *G07C 9/00* | (2020.01) |
| *H04W 48/04* | (2009.01) |
| *G01S 5/04* | (2006.01) |
| *H04W 4/30* | (2018.01) |
| *H04W 4/48* | (2018.01) |
| *H04W 4/02* | (2018.01) |

(52) U.S. Cl.
CPC .......... *B60R 25/245* (2013.01); *B60W 10/08* (2013.01); *G01S 5/04* (2013.01); *G07C 9/00309* (2013.01); *H04W 4/30* (2018.02); *H04W 48/04* (2013.01); *B60R 2325/101* (2013.01); *B60R 2325/205* (2013.01); *G07C 2009/00547* (2013.01); *G07C 2209/63* (2013.01); *H04W 4/023* (2013.01); *H04W 4/48* (2018.02)

(58) Field of Classification Search
CPC ........ B60R 25/245; B60W 10/08; G01S 5/04; G07C 2009/00547; G07C 2209/63; G07C 9/00309; H04W 48/04; H04W 4/04
See application file for complete search history.

(56) References Cited

U.S. PATENT DOCUMENTS

| | | | |
|---|---|---|---|
| 7,885,643 B2 | 2/2011 | Shimomura | |
| 8,515,654 B2 | 8/2013 | Turner et al. | |
| 8,626,144 B2 | 1/2014 | Talty et al. | |
| 8,930,045 B2 * | 1/2015 | Oman ................... | G01S 13/765 |
| | | | 701/2 |
| 9,008,917 B2 | 4/2015 | Gautama et al. | |
| 9,123,244 B2 | 9/2015 | Daman et al. | |
| 9,185,652 B2 | 11/2015 | Xie et al. | |
| 9,218,700 B2 | 12/2015 | Gautama et al. | |
| 9,688,247 B1 | 6/2017 | Jayaraman et al. | |
| 9,794,753 B1 | 10/2017 | Stitt et al. | |
| 9,894,492 B1 | 2/2018 | Elangovan et al. | |
| 10,002,479 B2 | 6/2018 | Oz et al. | |
| 2010/0202346 A1 | 8/2010 | Sitzes et al. | |
| 2011/0215921 A1 | 9/2011 | Ben Ayed et al. | |
| 2012/0045058 A1 | 2/2012 | Weghaus | |
| 2013/0214732 A1 | 8/2013 | Nowottnick | |
| 2014/0152091 A1 | 6/2014 | Muller et al. | |
| 2014/0188348 A1 | 7/2014 | Gautama et al. | |
| 2014/0240091 A1 * | 8/2014 | Talty ................. | G07C 9/00309 |
| | | | 340/5.62 |
| 2014/0274013 A1 | 9/2014 | Santavicca | |
| 2014/0330449 A1 * | 11/2014 | Oman ..................... | B60R 25/01 |
| | | | 701/2 |
| 2014/0364119 A1 | 12/2014 | Bradley et al. | |
| 2015/0148989 A1 | 5/2015 | Cooper et al. | |
| 2015/0161832 A1 | 6/2015 | Esselink et al. | |
| 2015/0161834 A1 * | 6/2015 | Spahl .................. | G07C 9/00111 |
| | | | 340/5.61 |
| 2015/0310681 A1 | 10/2015 | Avery et al. | |
| 2015/0356797 A1 | 12/2015 | McBride et al. | |
| 2016/0041820 A1 | 2/2016 | Ricci et al. | |
| 2016/0050563 A1 | 2/2016 | Bronk | |
| 2016/0063786 A1 * | 3/2016 | Lewis .................... | B60R 25/24 |
| | | | 340/5.72 |
| 2016/0087485 A1 | 3/2016 | Maeda et al. | |
| 2016/0150407 A1 | 5/2016 | Michaud et al. | |
| 2017/0018128 A1 | 1/2017 | Berezin et al. | |
| 2017/0062938 A1 | 3/2017 | Cheng et al. | |
| 2017/0104589 A1 | 4/2017 | Lambert et al. | |
| 2017/0132533 A1 | 5/2017 | Darnell et al. | |
| 2017/0236351 A1 | 8/2017 | Menard et al. | |
| 2017/0303080 A1 | 10/2017 | Stitt et al. | |
| 2017/0303090 A1 | 10/2017 | Stitt et al. | |
| 2017/0309098 A1 | 10/2017 | Watters et al. | |
| 2017/0330402 A1 | 11/2017 | Menard et al. | |
| 2018/0029560 A1 | 2/2018 | Mohaupt et al. | |
| 2018/0126952 A1 | 5/2018 | Niemiec | |
| 2018/0154865 A1 | 6/2018 | Bianchi, III et al. | |
| 2018/0269565 A1 | 9/2018 | Guthrie et al. | |

FOREIGN PATENT DOCUMENTS

| | | |
|---|---|---|
| EP | 2800068 A2 | 11/2014 |
| FR | 3026212 A1 | 3/2016 |
| WO | WO-2015024185 A1 | 2/2015 |
| WO | WO-2015032956 A2 | 3/2015 |
| WO | WO-2015103605 A1 | 7/2015 |
| WO | WO-2015160859 A1 | 10/2015 |
| WO | WO-2015177298 A1 | 11/2015 |
| WO | WO-2016012723 A1 | 1/2016 |
| WO | WO-16156682 A1 | 10/2016 |
| WO | WO-2017/181035 A1 | 10/2017 |
| WO | WO-2017/181050 A1 | 10/2017 |
| WO | WO-18040641 A1 | 3/2018 |

OTHER PUBLICATIONS

International Search Report and Written Opinion dated Dec. 22, 2017 in corresponding application No. PCT/US2017/056347 (13 pages).

International Search Report and Written Opinion dated Jul. 9, 2018 in corresponding application No. PCT/US2017/056343 filed Oct. 12, 2017.

\* cited by examiner

LOCALIZATION AND PASSIVE ENTRY/PASSIVE START SYSTEMS AND METHODS FOR VEHICLES

CROSS-REFERENCE TO RELATED APPLICATIONS

This application is a continuation of U.S. patent application Ser. No. 15/730,302 filed on Oct. 11, 2017. This application claims the benefit of U.S. Provisional Application No. 62/407,190, filed on Oct. 12, 2016. This application also claims the benefit of U.S. Provisional Application No. 62/450,235, filed on Jan. 25, 2017. The entire disclosures of each of the above applications are incorporated herein by reference.

FIELD

The present disclosure relates to localization and passive entry/passive start (PEPS) systems and methods for vehicles and, more particularly, to PEPS systems and methods using Bluetooth Low Energy (BLE) communication devices.

BACKGROUND

This section provides background information related to the present disclosure which is not necessarily prior art.

Traditionally, a PEPS system allows anyone in possession of a key fob that has been previously paired with a vehicle's central PEPS electronic control unit (ECU) to access the vehicle by simply grabbing the door handle and to start the vehicle with a push of a button. In response to a button push, the central PEPS ECU authenticates the key fob to determine if the key fob is authorized to access the vehicle and uses the signal strength indicated by a plurality of vehicle antennas to estimate the location of the Key Fob. If the Key Fob can be authenticated and is located within an authorizing zone, the vehicle's function is made available to the user (i.e. doors are unlocked or vehicle is started).

Traditional PEPS systems use proprietary grade radio protocols using low frequency (LF) signals of approximately 125 kHz. Traditional PEPS systems are also hampered by the physics of the LF systems. LF was selected by early PEPS systems because the wave propagation allows for relatively accurate estimation of range and location by using signal strength within the typical target activation range of 2 meters. However, due to the extremely long wavelength of the LF signal compared to the size of a practical vehicle antenna and key fob receiver, it is difficult within reasonable power consumption and safe transmit power levels to reliably communicate with a key fob using LF beyond a few meters.

SUMMARY

This section provides a general summary of the disclosure, and is not a comprehensive disclosure of its full scope or all of its features.

The present disclosure provides a system comprising a communication gateway in a vehicle configured to establish a Bluetooth low energy (BLE) communication connection with a portable device. The system also includes a plurality of sensors in communication with the communication gateway, each configured to receive connection information about the BLE communication connection from the communication gateway, to eavesdrop on the BLE communication connection based on the connection information, and to measure signal information about at least one communication signal sent from the portable device to the communication gateway. The system also includes a localization module configured to receive the signal information from each of the plurality of sensors and to determine a location of the portable device based on the signal information from the plurality of sensors. The system also includes a passive entry/passive start (PEPS) system configured to receive the location of the portable device from the localization module and to perform a vehicle function including at least one of unlocking a door of the vehicle, unlocking a trunk of the vehicle, and allowing the vehicle to be started based on the location of the portable device.

In other features, the signal information includes a received signal strength of the at least one communication signal sent from the portable device to the communication gateway.

In other features, the signal information includes at least one of a timestamp, an angle of arrival, and a time difference of arrival of the at least one communication signal.

In other features, the connection information includes at least one of a channel map, a channel hop interval, a slave latency, a next channel, a next channel time, a clock accuracy, filtering data, channel pre-scan parameters, channel post-scan parameters, and connection monitoring parameters associated with the BLE communication connection.

In other features, in response to receiving the connection information from the communication gateway, each of the sensors is further configured to determine a next scheduled communication between the communication gateway and the portable device based on the connection information and to eavesdrop on the next scheduled communication.

In other features, the PEPS system is further configured to compare the location of the portable device to a first predetermined area and to a second predetermined area, to allow the vehicle function to be performed when the location of the portable device is within the first predetermined area, to receive user input indicating whether to prevent or allow the vehicle function when the location of the portable device is within the second predetermined area, and to prevent or allow the vehicle function when the location of the portable device is within the second predetermined area based on the user input.

In other features, the PEPS system is further configured to compare the location of the portable device to a first predetermined area and to a second predetermined area, to allow the vehicle function to be performed when the location of the portable device is within the first predetermined area, to generate an alert to the portable device prior to performing the vehicle function when the location of the portable device is within the second predetermined area, to receive user input from the portable device in response to the alert indicating whether to prevent or allow the vehicle function, and to prevent or allow the vehicle function when the location of the portable device is within the second predetermined area based on the user input received from the portable device.

In other features, the system includes a security filtering module configured to receive information indicating an arrival time at which a communication packet was received, to compare the arrival time with an expected arrival time, and to determine whether the communication packet was received from an unauthorized device based on the comparison.

In other features, the system includes a security filtering module configured to inspect and compare data included in a communication packet received by the communication gateway and each sensor of the plurality of sensors, to confirm whether the data included in the communication packet received by the communication gateway matches the data included in the communication packet received by each sensor of the plurality of sensors, and to generate an alert to the portable device indicating that the PEPS system is under attack when the data included in the communication packet received by the communication gateway does not match the data included in the communication packet received by each sensor of the plurality of sensors.

In other features, the PEPS system is further configured to receive motion data from the portable device indicating detected motion of the portable device, to compare the motion data with a predetermined threshold, and to disable the vehicle function when the motion data is greater than the predetermined threshold.

The present disclosure also provides a method that includes establishing, with a communication gateway in a vehicle, a Bluetooth low energy (BLE) communication connection with a portable device. The method also includes receiving, with a plurality of sensors in communication with the communication gateway, connection information about the BLE communication connection from the communication gateway. The method also includes eavesdropping, with the plurality of sensors, on the BLE communication connection based on the connection information. The method also includes measuring, with the plurality of sensors, signal information about at least one communication signal sent from the portable device to the communication gateway. The method also includes receiving, with a localization module, the signal information from each of the plurality of sensors. The method also includes determining, with the localization module, a location of the portable device based on the signal information from the plurality of sensors. The method also includes receiving, with a passive entry/passive start (PEPS) system, the location of the portable device from the localization module. The method also includes performing, with the PEPS system, a vehicle function including at least one of unlocking a door of the vehicle, unlocking a trunk of the vehicle, and allowing the vehicle to be started based on the location of the portable device.

In other features, the signal information includes a received signal strength of the at least one communication signal sent from the portable device to the communication gateway.

In other features, the signal information includes at least one of a timestamp, an angle of arrival, and a time difference of arrival of the at least one communication signal.

In other features, the connection information includes at least one of a channel map, a channel hop interval, a slave latency, a next channel, a next channel time, a clock accuracy, filtering data, channel pre-scan parameters, channel post-scan parameters, and connection monitoring parameters associated with the BLE communication connection.

In other features, the method also includes, in response to receiving the connection information from the communication gateway, determining, with each of the sensors in the plurality of sensors, a next scheduled communication between the communication gateway and the portable device based on the connection information and eavesdropping, with each of the sensors in the plurality of sensors, on the next scheduled communication.

In other features, the method also includes comparing, with the PEPS system, the location of the portable device to a first predetermined area and to a second predetermined area. The method also includes allowing, with the PEPS system, the vehicle function to be performed when the location of the portable device is within the first predetermined area. The method also includes receiving, with the PEPS system, user input indicating whether to prevent or allow the vehicle function when the location of the portable device is within the second predetermined area. The method also includes preventing or allowing, with the PEPS system, the vehicle function when the location of the portable device is within the second predetermined area based on the user input.

In other features, the method also includes comparing, with the PEPS system, the location of the portable device to a first predetermined area and to a second predetermined area. The method also includes allowing, with the PEPS system, the vehicle function to be performed when the location of the portable device is within the first predetermined area. The method also includes generating, with the PEPS system, an alert to the portable device prior to performing the vehicle function when the location of the portable device is within the second predetermined area. The method also includes receiving, with the PEPS system, user input from the portable device in response to the alert indicating whether to prevent or allow the vehicle function. The method also includes preventing or allowing, with the PEPS system, the vehicle function when the location of the portable device is within the second predetermined area based on the user input received from the portable device.

In other features, the method also includes receiving, with a security filtering module, information indicating an arrival time at which a communication packet was received. The method also includes comparing, with the security filtering module, the arrival time with an expected arrival time. The method also includes determining, with the security filtering module, whether the communication packet was received from an unauthorized device based on the comparison.

In other features, the method also includes inspecting and comparing, with a security filtering module, data included in a communication packet received by the communication gateway and each sensor of the plurality of sensors. The method also includes confirming, with the security filtering module, whether the data included in the communication packet received by the communication gateway matches the data included in the communication packet received by each sensor of the plurality of sensors. The method also includes generating, with the security filtering module, an alert to the portable device indicating that the PEPS system is under attack when the data included in the communication packet received by the communication gateway does not match the data included in the communication packet received by each sensor of the plurality of sensors.

In other features, the method also includes receiving, with the PEPS system, motion data from the portable device indicating detected motion of the portable device. The method also includes comparing, with the PEPS system, the motion data with a predetermined threshold. The method also includes disabling, with the PEPS system, the vehicle function when the motion data is greater than the predetermined threshold.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
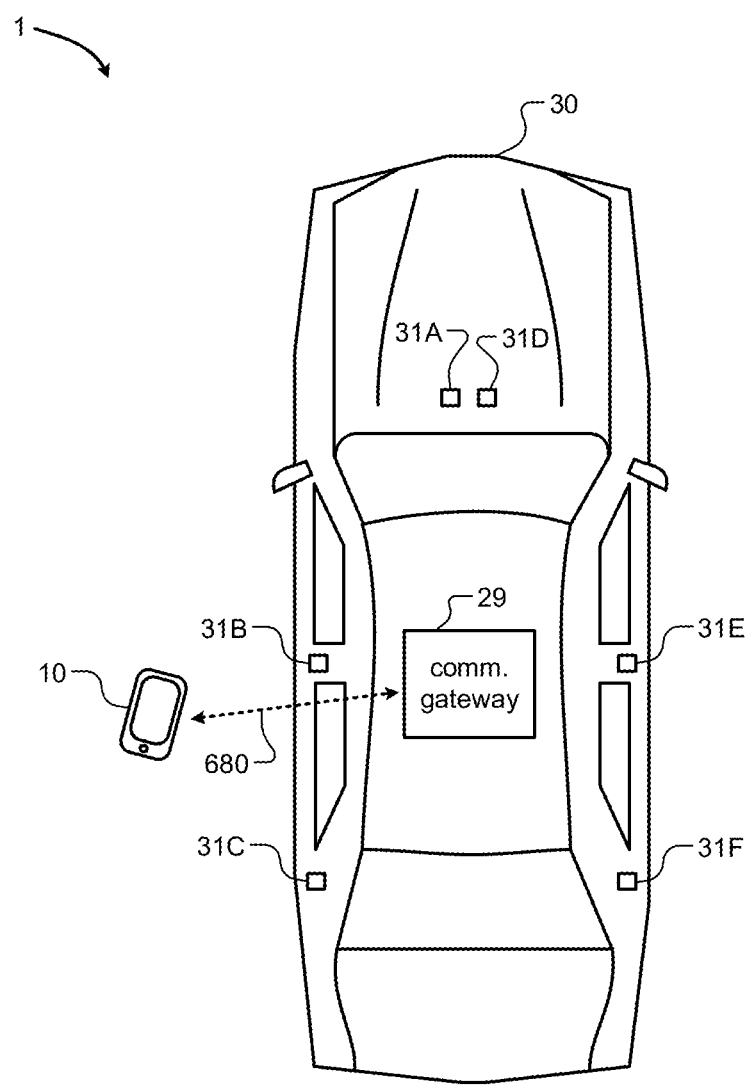
FIG. 1 illustrates a subject vehicle with a PEPS system according to the present disclosure.

Example embodiments will now be described more fully with reference to the accompanying drawings.

The present disclosure related to systems, methods, and architecture to implement a PEPS system using a consumer grade wireless protocol based on the standardized specification of the Bluetooth Consortium. Specifically, the present disclosure relates to a PEPS system using the Bluetooth Low Energy (BLE) communication protocol for communication between the vehicle and a BLE enabled user device, such as a smartphone or a wearable device. Further, the present disclosure applies to vehicle systems with keyless systems, generally referred to as PEPS systems or keyless entry and keyless go systems. In general a PEPS system is a type of localization system. The present disclosure is directed to systems, method, and architecture that securely implement a localization system targeting PEPS applications that uses a sensor network configured to find existing connections between a BLE device and the vehicle and measuring the timing and signal characteristics of the communication. In this way, the present disclosure provides a PEPS system that provides secure access to vehicle features for the authorized user of the vehicle by locating a wireless device relative to the vehicle and comparing the location of the wireless device to decision criteria. As discussed in detail below, the PEPS systems of the present disclosure include a central module that collects received signal strengths received from the wireless device from a plurality of sensors placed in and about the vehicle. The central module, for example, includes an encryption key and a challenge response algorithm for authentication of the wireless device. In this way, as discussed in detail below, the present disclosure describes a power efficient and private method to implement a PEPS system using the BLE communication protocol.

It is desirable to allow users to use their smart devices, such as smartphones and other devices, such as wearable devices, as a vehicle key. As discussed in detail below, this will enable digital key sharing applications. In addition, long range distancing features is also becoming critical for convenience features like passive welcome lighting, distance bounding on remote parking applications and so on. Such systems and advantages are not achievable with traditional PEPS systems because each vehicle manufacturers and PEPS system suppliers traditionally implement proprietary closed systems using radio frequencies that are not used by ubiquitous devices, such as smart phones.

The systems, methods, and architecture of the present disclosure include PEPS systems having a central module for making decisions and a plurality of sensor modules that serve as direct replacements for the plurality of LF antennas used on traditional PEPS systems. The systems, methods, and architecture of the present disclosure differ from the traditional LF PEPS systems in both the timing of when data is collected and how the data flows and is processed through and by the system.

Figure 2:
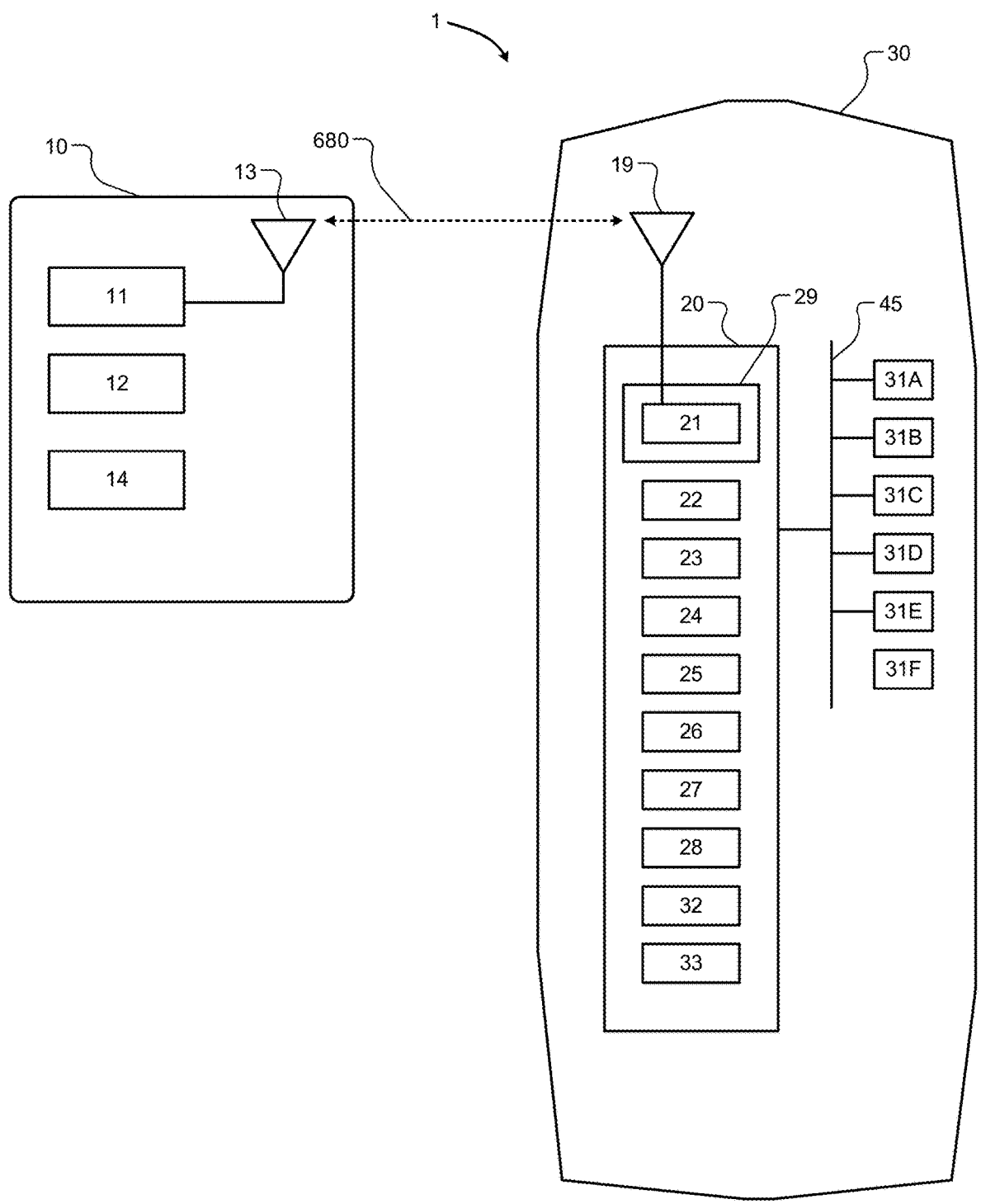
FIG. 2 illustrates a block diagram for a PEPS system according to the present disclosure.

With reference to FIGS. 1 and 2, the PEPS system 1, which may also be referred to as a localization system, is provided within a vehicle 30 and includes a communication gateway 29 and a plurality of sensors 31A-31F, referred to collectively as 31. The PEPS system 1 includes one or more vehicle modules 20 that are distributed throughout the vehicle 30 and are able to communicate with each other through, for example, a vehicle interface 45. In addition, some of the modules may be integrated into a single ECU or are able to communicate with each other using the vehicle interface 45. The vehicle interface 45, for example, may include a controller area network (CAN) bus for communication between main modules and/or lower data rate communication such as local interconnect network (LIN) for communication between the plurality of sensors 31A-31F. The vehicle interface 45 can also include a clock extension peripheral interface (CXPI) bus. Additionally or alternatively, the vehicle interface 45 can include a combination of CAN bus, LIN, and CXPI bus communication interfaces. The structure of the sensors 31 are discussed in further detail below with reference to FIG. 3.

The vehicle modules 20 can include, for example, the communication gateway 29 that includes a BLE chipset 21 connected to an antenna 19. As shown in FIG. 2, the antenna 19 may be located in the vehicle 30. Alternatively, the antenna 19 may be located included within the vehicle modules 20. Alternatively, the antenna 19 may be located outside of the vehicle 30. The vehicle modules 20 can also include a link authentication module 22 that authenticates a portable device 10 for communication via a secure communication link 680. The vehicle modules 20 can also include a data management layer 23 for push data. The vehicle modules 20 can also include a connection information distribution module 24. The vehicle modules 20 can also include a timing control module 25. The vehicle modules 20 can also include a telematics module 26, such as a global positioning system (GPS) module and/or other navigation or location modules. The vehicle modules 20 can also include a PEPS module 27. The vehicle modules 20 can also include a body control module. The vehicle modules 20 can also include a sensor processing and localization module 32. The vehicle modules 20 can also include a security filtering module 33.

As shown in FIGS. 1 and 2, the portable device 10 can communicate with the communication gateway 29 of the vehicle 30 via the secure communication link 680. Without limitation, the portable device 10 may be any Bluetooth enabled communication device such as a smart phone, smart watch, wearable electronic device, key fob, tablet device, or other device associated with a user of the vehicle 30, such as an owner, driver, passenger of the vehicle 30, and/or a technician for the vehicle 30. The portable device 10 can include a BLE chipset 11 connected to an antenna 13. The portable device 10 can also include application software 12 stored in a computer-readable storage module or device. The portable device 10 can also optionally include a GPS module 14 or other device location service.

The portable device 10 and the communication gateway 29 can establish the secure communication link 680, as a Bluetooth communication link, as provided for and defined by the Bluetooth specification. For example, the secure communication link 680 between the portable device 10 and the communication gateway 29 can be a BLE communication link. The PEPS system 1 may be configured to provide additional authentication of the secure communication link 680 with the portable device. For example, the communication gateway 29 can communicate with the link authentication module 22 to authenticate the portable device 10 and establish the secure communication link 680. For example, the link authentication module 22 can be configured to implement challenge-response authentication. In such case, timing information about the communication between the communication gateway 29 and the portable device 10 is sent to the timing control module 25, which communicates with the sensors 31A-31F through the vehicle interface 45, as described below. Further, the communication gateway 29 can communicate information about communication channels and channel switching parameters to the connection information distribution module 24. The connection information distribution module 24 is configured to communicate with each of the sensors 31A-31F using the vehicle interface 45 and to provide the sensors 31A-31F with communication information necessary for the sensors 31A-31F to find and then follow, or eavesdrop on, the secure communication link 680 once the sensors 31A-31F are synchronized with the communication gateway 29. While FIGS. 1 and 2 illustrate a PEPS system 1 with six sensors 31A-31F, any number of sensors can be used. For example, the PEPS system can include seven, eight, nine, ten, eleven, twelve, or more sensors. In this way, while the present disclosure provides an example utilizing six sensors, additional or fewer sensors can be used in accordance with the present disclosure.

Figure 3:
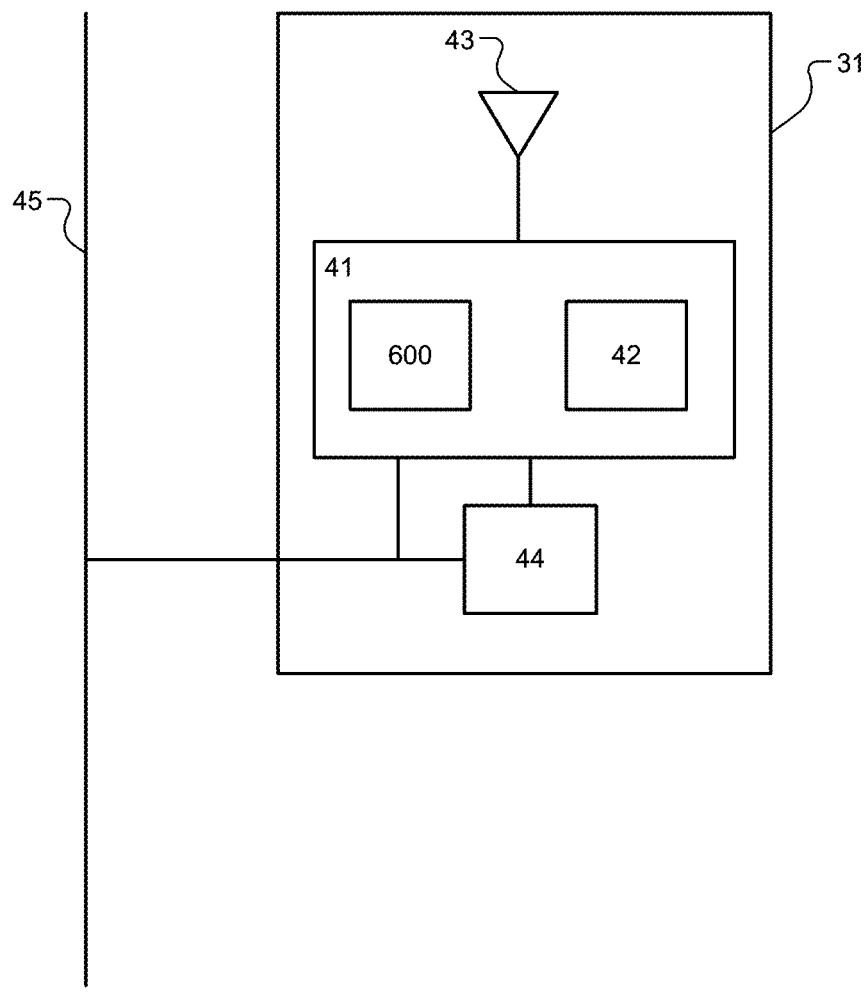
FIG. 3 illustrates a block diagram for a sensor of a PEPS system according to the present disclosure.

With reference to FIG. 3, each of the sensors 31 includes a BLE chipset 41 connected to an antenna 43. As shown in FIG. 3, the antenna 43 may be located internal to the sensors 31. Alternatively, the antenna 43 may be located external to the sensors 31. The sensors 31 receive BLE Signals using the antenna 43 and, specifically, receive BLE physical layer messages using a BLE physical layer (PHY) controller 600. The sensors 31 are capable of observing BLE physical layer messages and taking measurements of the physical properties of the associated signals, including, for example, the received signal strength (RSSI) using a channel map that is produced by a channel map reconstruction module 42. Additionally or alternatively, the sensors 31 can determine other measurements of the physical properties of the associated signals, including, for example, data related to the angle of arrival. Additionally or alternatively, the sensors 31 can communicate with each other and/or communicate with the communication gateway 29 via the vehicle interface to determine time difference of arrival, time of arrival, or angle of arrival data for signals received by multiple sensors. The sensors 31 receive timing information and channel map information from the communication gateway 29 via the vehicle interface 45. A timing synchronization module 44 is configured to accurately measure the reception times of messages on the vehicle interface 45 and pass the timing information to the BLE chipset 41. The BLE chipset 41 is configured to take the channel map information and the timing signals and to tune the PHY controller 600 to a specific channel at a specific time and observe all physical layer messages and data that conform to the Bluetooth physical layer specification, which includes the normal data rates proposed or adopted, for example, in the Bluetooth Specification version 5.0. The data, timestamps and measured signal strength are reported by the BLE chipset 41 to the communication gateway 29, or other vehicle modules 20, of the vehicle 30 via the vehicle Interface 45.

Figure 4:
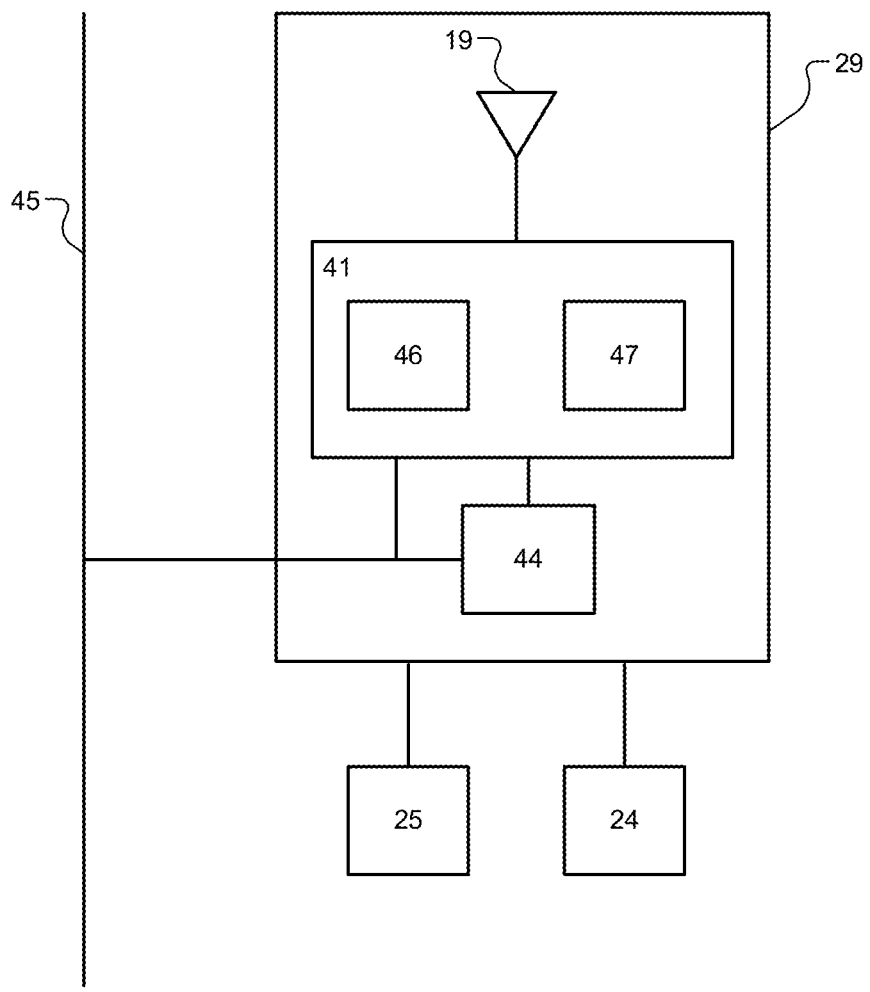
FIG. 4 illustrates a communication gateway of a PEPS system according to the present disclosure.

With reference to FIG. 4, the communication gateway 29 includes a BLE chipset 41 connected to an antenna 19 to receive BLE Signals. The BLE chipset 41 implements a Bluetooth protocol stack 46 that is, for example, compliant with the BLE specification, including, for example, version 5 of the BLE specification. The BLE chipset 41 also includes an application 47 implemented by application code stored in a computer-readable medium, such as a storage module. The application 47 may include modifications outside of the Bluetooth specification to enable the BLE chipset 41 to inspect timestamped data transmitted and received by the BLE chipset 41, regardless of the validity of the data. For example, the application 47 enables the BLE chipset 41 to compare transmitted and received data against expectations. The communication gateway 29 is configured to transmit the actual transmitted and received data to vehicle systems of the vehicle 30 via the vehicle interface 45. Alternatively, the communication gateway 29 can be configured to receive the data from each of the sensors 31 via the vehicle interface 45. The application 47 can be further configured to enable the BLE chipset 41 to confirm that each of the sensors 31 has received the correct data at the correct time, as described in further detail below.

With continued reference to FIG. 4, the communication gateway 29 is further configured to provide information about ongoing connections and timing signals necessary for each of the sensors 31 to find the connection being maintained by the communication gateway 29 with the portable device 10, for example, and to subsequently follow the connection. The Bluetooth protocol stack 46 is configured to provide the channel map, access identifier, next channel, and the time to the next channel to the application 47. The Bluetooth protocol stack 46 is configured to output timing signals for the timestamps of transmission and reception events to the application 47 and/or a digital PIN output of the BLE Chipset 41. The communication gateway 29 also includes a timing synchronization module 44. The timing synchronization module 44 is configured to accept the timing signals and works in conjunction with the vehicle interface 45 to create accurate time stamps of connection information messages and other communications.

Traditional BLE PEPS systems use BLE advertising data, as described in U.S. Pub. No. 2014/0188348, which is incorporated herein by reference. In such systems, a secure link between an authorized portable device and a PEPS module is established. When authorized access to a vehicle feature, such as unlocking a door, is required, the portable device must send advertising signals to the PEPS module. The PEPS module receives the advertising signals on each of the sensors, processes the information and makes a decision about the location of the portable device. U.S. Pub. No. 2014/0188348 A also describes a system whereby the portable device would need to individually connect to each of the sensors of the PEPS System. This type of system it has several disadvantages. For example, it may not be possible for the portable device to connect to each of the sensors. A typical limitation would limit the number of connections to seven sensors, due the fact that most BLE chipsets support a total of eight connections, with one connection typically being a secure connection to a communication gateway. Moreover, there is a time delay between the connection events with each sensor. As such, each sensor would not be measuring the same signal. For example, because BLE uses frequency hop spread spectrum (FHSS), each sensor would typically be measuring the signal from the portable device at a different time on a different channel. This could result in potential mission critical loss of accuracy.

The BLE specification specifies the usage of forty communication channels, with three of the channels being known as "advertising" channels. These advertising channels are used for devices to discover each other and report some basic information about what kind of device they are. For example, advertising data contains the address of the device broadcasting the advertising packet as typically the name of the device along with which services the device offers. Automotive systems can detect and measure advertising channel packets for the purpose of locating where the phone is located relative to the vehicle. However, as discussed in detail below, such systems can be vulnerable to injection of advertising data and are subject to an additional communication burden required by the advertiser to continue advertising. Therefore, it can be more beneficial to use the other thirty seven "connected channels" for the purpose of locating the device.

Once two devices are connected, the device that was broadcasting is no longer required to do so to satisfy communication requirements. However, if that device is required to be located by a system using an advertising channel it must continue to broadcast on the advertising channels, creating a significant power consumption problem on a battery operated device. Therefore, a system using connection data, can offer security advantages as well as power savings advantages for devices. Such a system also enables the systems to monitor the locations of devices that do not consider themselves part of the system, such as tracking a smart watch that is not connected directly to the vehicle system.

Traditional BLE PEPS systems using advertising date are susceptible to attack. For example, the attacker can use a packet sniffer to collect advertising data from all nearby devices, including the authorized portable device. The authorized portable device 200 is outside of the authorization zones for any PEPS System. The attacker can set their radio transmit power to a similar transmit power as the portable device, which is typically a smart phone, and can easily be characterized by the attacker 201. After setting the transmit power, the attacker can move into an exterior authorizing zone of the PEPS system, typically an outside door. The attacker can then clone the advertising data and inject into the PEPS system. Depending on the sophistication of protections built into the PEPS System, he attacker can also use an active interference mode to interfere with the PEPS System to correctly receive the original advertising packet.

Traditional BLE chipsets and software stack implementations are not configured to detect this type of injection of advertising data and no part of the BLE specification guarantees tight deterministic arrival times of advertising data. Without timing synchronization between each of the sensors, no guarantee can be made as to whether each sensor is measuring the same signal or not, leaving the system critically open to clone, interfere, and injection attacks.

The present disclosure, on the other hand, provides a PEPS system 1 that enables the sensors 31 to follow the connected data between an authorized portable device 10 and the communication gateway 29, to make measurements on the communication signals, and to verify that the measured data was not injected by an attacker. Many of the injection prevention techniques are applicable to advertising data. However, the present disclosure provides a more secure and energy efficient PEPS system 1 by eliminating the need for the portable device 10 to advertise. This is accomplished enabling the sensors 31 to find and follow the pre-existing connected data, with each sensor measuring a signal with known expectations in arrival time and frequency channel, thereby guaranteeing that all sensors 31 are measuring the same signal. In this way, the PEPS system 1 of the present disclosure shares information about the existing connection between the portable device 10 and the communication gateway 29 with each of the sensors 31. In this way, each of the sensors 31 are able to find the existing communication connection between the portable device 10 and the communication gateway 29, to start following the communication connection, and to maintain accurate timing with the communication connection. The PEPS system 1 of the present disclosure also enables each of the sensors 31 to verify that an attacker is not attempting to inject data into the system. The same anti-injection techniques are applicable to advertising systems, such as those described in U.S. Pub. No. 2014/0188348. Further, while the many of the anti-injection techniques of the present disclosure apply to advertising data, the timing related anti-injection techniques require the deterministic timing that only connection data can provide.

In a traditional BLE PEPS system, an attacker can clone advertising packets from an authorized portable device and inject them into the PEPS system. Each BLE packet has a header consisting of a pre-amble and an access address, a data section consisting of a data header and data payload, and a CRC. The attacker can observe all of this information and clone all of the data. Immediately following reception of all the data from a packet, the attacker, by virtue of physical location or by modulating the transmit power, can then replay the exact duplicate of the data on the same frequency channel into the PEPS system causing the sensors to read an injection measurement. In order to protect itself, the PEPS system must detect that there are two copies of the same or similar data within an expected time window to determine it is under attack. Any part of the packet, or mathematical derivation, either within the sensor itself or the broader PEPS System can be checked for duplicates matching an attack pattern. The most useful information is the channel number on which the data was received, a synchronized timestamp across the entire PEPS System, and the access address of the connected data.

The attacker does not need to know which of the possible plurality of nearby advertising devices is the authorized portable device. Rather, the attacker can clone every copy of advertising data from all nearby devices. A slightly more sophisticated hacker could perform a clone across all three advertising channels simultaneously. This technique would guarantee that if there is an authorized portable device, that the data would be successfully cloned and injected.

In addition, a more sophisticated hacker can cause the traditional PEPS system to reject the original packet so the injected packet is the only valid packet observed. BLE chipsets and stacks will reject any message that does not have a valid CRC. The attacker can clone all the data in a packet up to the end of the data section. The attacker can then use either prior knowledge about packet lengths or decode the packet length using the information in the data header to calculate the time at which the last data byte is received. All of the useable data up to the CRC can thereby be received by the attacker. The attacker can then use on-board processing to compute the correct CRC for the message and transmit a signal onto the physical channel that will cause the checksum to become corrupted. The traditional PEPS System is then likely to receive the message in a corrupted form. Immediately following when the CRC is transmitted by the authorized portable device and corrupted by the attacker, the attacker can then reconstruct a packet using the data that was cloned from packet with the checksum computed and inserting the checksum into the packet. The reconstructed packet can now be injected into the traditional PEPS System.

Typically, a BLE protocol stack discards messages with invalid CRC fields and does not report this information to upper applications. In order for a BLE PEPS system to protect itself against the type attack described above, the BLE protocol stack must be modified to report messages even when the CRC is invalid. That is the message that would normally be discarded by the BLE protocol stack must be made available to the PEPS System for processing. Most notably, the application should detect that there are two messages with the same payload within a given time frame, although the CRC for the first packet is invalid. The PEPS System could then determine that the system has been attacked by an attempted injection.

In addition, even if a BLE PEPS system includes sensors with a modified BLE protocol stack to detect corrupted messages and can protect itself by handling the injected data, as described above, it is still possible for the BLE PEPS system to be susceptible to a radio frequency (RF) isolation attack. With an RF isolation attack, the attacker provides RF isolation of the sensors that are located on the outside of the vehicle. For example, a simple box providing RF isolation to the inside of the box with an antenna on the outside for cloning advertisements and an antenna on the inside for injecting the advertising signal to a sensor can be used to defeat a modified BLE protocol stack and allow for injection of data into the sensor and the PEPS System.

In order for a PEPS system to protect itself against an RF isolation attack, two techniques are required. The first technique utilizes very accurate timing expectations for the arrival time of the signal whereby the PEPS System has a timing synchronization method to ensure that the PEPS System has a method to check the time of arrival of incoming signals from each sensor and compare the actual time of arrival of incoming signals to the expected time of arrival. Mismatches in global timing across all sensors would indicate that the data was cloned or injected. A mismatch where sensors can be grouped into two or more different sets based on arrival time would indicate that an attacker has isolated a sensor from receiving the true signal and then injected a cloned copy.

Figure 5:
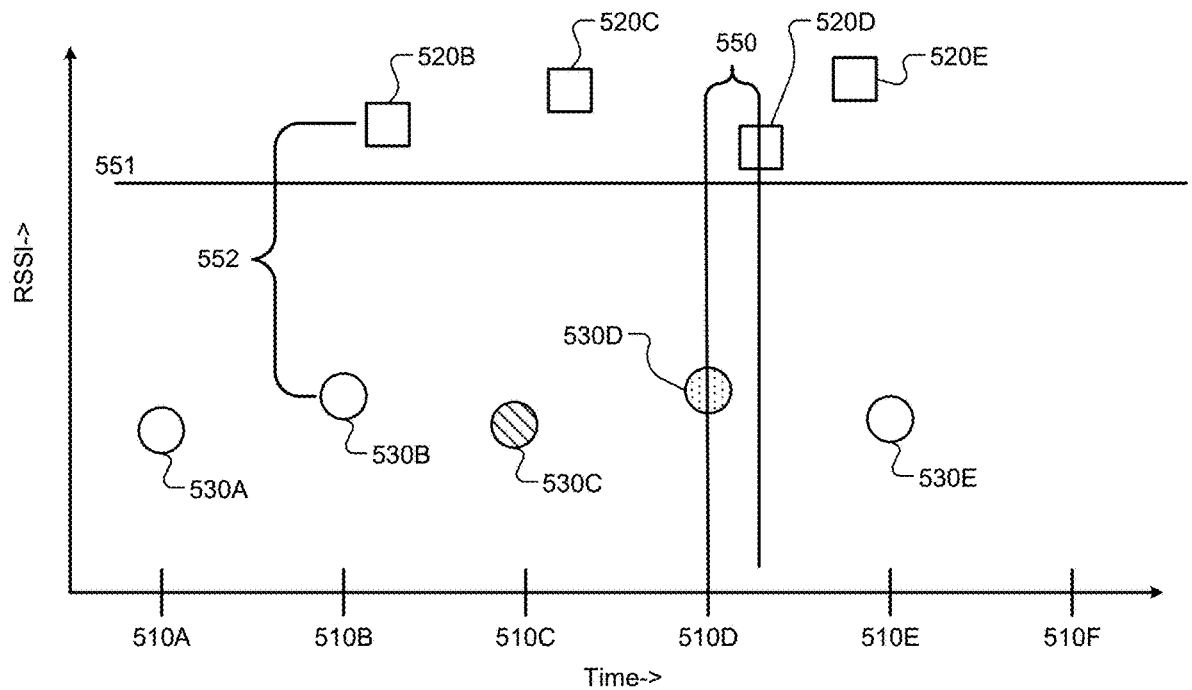
FIG. 5 illustrates a timing diagram for a sensor receiving data from an authorized device and data from an attacker.

The present disclosure provides methods to detect and mitigate the risk of an injection attacks. FIG. 5, for example, illustrates what a sensor might observe if it were under various types of physical layer attacks. In FIG. 5, the horizontal axis represents time, with tick marks 510A-F representing the expected protocol interval of data from an authorized portable device. The protocol timing 510A-F for BLE communication is either the expected advertising interval of the authorized portable device or the connection interval and slave latency parameters for the connection between the portable device and the communication gateway within the PEPS System. In FIG. 5, the vertical axis represents the signal strength the sensor will receive from the attacker and the signal strength received the authorized portable device.

For exemplary purposes, the stronger RSSI value as received by the sensor causes the PEPS System to authorize a vehicle feature. For an attacker to successfully mount an attack against the PEPS System, the attacker must inject RSSI values that are stronger than some configurable decision threshold 551. The attacker mounts the attack by observing communications 530 and cloning the data. Subsequently, the attacker replays the data to the PEPS System with a signal strength 520 appropriate to meet or exceed the decision criteria 551.

With continued reference to FIG. 5, time interval 510A corresponds to an accurate measurement from the authorized portable device. The important characteristic is that there is only one sampled measurement 530A occurring within expected tolerances of the tick 510A. The PEPS System should judge the point 530A as a valid measurement for further processing because no suspicious data has been observed on the BLE Physical Layer.

At time interval 510B, an attacker attempts to clone copy the data contained in packet 530B and inject at 520B. The sensor and a subsequent security filtering module 33, discussed in detail below with reference to FIGS. 6 and 7, can detect that data was injected by one or more of the following described techniques. First, the security filter module can count the number of packets that were observed that purportedly originated from the authorized portable device and comparing this number to the maximum possible number of packets that the protocol would allow from the portable device 200. In this technique, at time interval 510B until the next expected arrival time at tick 510C, two points 520B and 530B purportedly originate from the authorized portable device, where the protocol would only allow one. Second, the security filter module can measure the variance or mathematical equivalents over any given time window and compare to a configurable threshold to ensure that the variance is within a bounded range expected from an authorized portable device. At time interval 510B, the variation computed 552 could be judged to be too high. It should be noted that the variance technique and the packet counting technique described here are equally suitable for applications across several time intervals.

With continued reference to FIG. 5, an attacker at time interval 510C attempts to inject cloned packet 520C into the PEPS system by cloning 530C up to the CRC and then interfering with the ability of the sensor to accurately receive the CRC. The sensor may implement special BLE protocol stack software processing for packets received with invalid checksums 530C, allowing the sensor and security filtering module 33 to count the corrupted data 530C in its counting algorithm as described in the previous section. Thus, at time interval 510C, two purported packets 520C and 530C are detected, where the protocol would only allow one packet to have originated from the authorized portable device during the same interval, allowing the PEPS system to determine that some data has been injected. Moreover, the special BLE Protocol stack processing of corrupted packets is equally applicable to other processing techniques, such as for inclusion in variance measurements or timing analysis.

An attacker at time interval 510D attempts to inject a cloned packet 520D into the sensor by placing an RF Isolator around the sensor preventing the sensor from receiving packet 530D. This attack would circumvent the two previously describe techniques of counting the number of packets in a time window and comparing to the maximum number the protocol would allow and checking for a variance that is outside the bounds if only the authorized portable device was producing the signals. The sensor would receive only one packet 520D during the time interval 510D. The sensor and the security filtering module 33 can detect the injection of this data by measuring the time at which the data was received and comparing it to the protocol timing. The difference between the expected time of arrival noted by the tick mark 510D and the actual arrival time of packet 520D is noted as 550. The sensors in the PEPS system require a synchronization method in order to measure time interval 550 accurately. The synchronization method is discussed in further detail below.

It should also be noted that the time interval 550 may represent a negative quantity if the injected data arrives before expected protocol timing 510D. This is illustrated in time interval 510E. A situation where the attacker can predict the value contained in 530E and inject early as 520E or a situation where the attacker implements a man-in-the-middle (MITM) attack, which adds a time delay by virtue of moving the tick mark 510E after when the attacker becomes aware of the data from the authorized portable device, thus allowing the attacker to inject 520E into the PEPS system before then relaying the data 530E to the system. In order to detect this type of attack, the sensors are configurable to scan for packets ahead of the anticipated arrival time 510E, looking for data that could have originated from the authorized portable device that will ultimately get injected into the system early. In general, it is difficult for a BLE device to detect if there is a relay MITM attacker gating messages due to the work load to pre-scan all of the thirty seven available connected channels that BLE provides, while also maintaining a communication link. However, in a PEPS system with a plurality of sensors, each sensor can be configured to search on a different channel to look for data from the portable device to the attacker. Moreover, it is worth noting that the attacker acting as a MITM will not produce packets 520E that are exactly equivalent to packets originating from the portable device, such as 530E. Most notably, the FHSS channel numbers will be different and the access address of the connection will also likely be different. What should then be searched for is addresses in each packet that are equivalent to the portable device and/or to the PEPS system itself.

Figure 6:
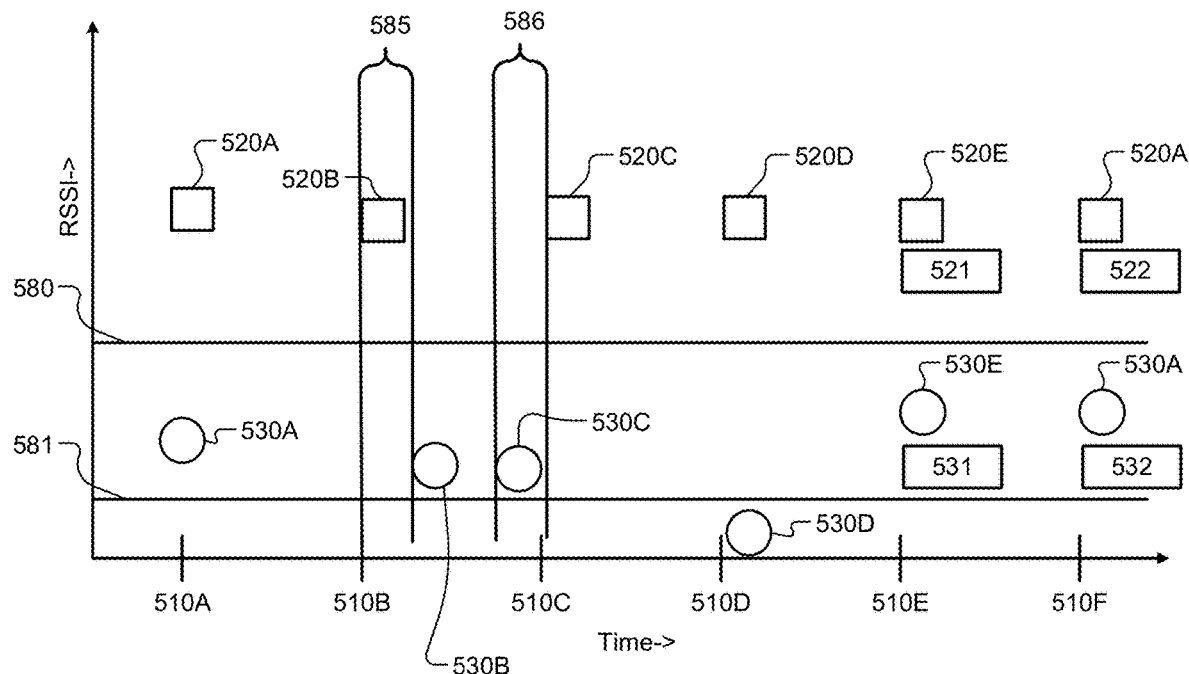
FIG. 6 illustrates a timing diagram for data received by two sensors.

While the above discussion described the types of measurements a single sensor can make to detect data injection attacks, FIG. 6 illustrates how a security filtering module 33, described in detail below, could operate to inspect data from a plurality of sensors searching for more sophisticated types of injections, whereby an attacker has successfully compromised a sensor or collection of sensors. With reference to FIG. 6, the horizontal axis on the chart represents time and the vertical axis represents the measured signal value. In the example of FIG. 6, the vertical axis represents RSSI. Each tick mark 510A-F represents the expected arrival time for each data sample in the PEPS system. The chart includes data 520A to 520D received from a sensor referred to as sensor A and data 530A to 530D received from a sensor referred to as sensor B. The values 520A-F are all assumed to meet a condition (not illustrated) whereby the authorized portable device is believed to be located in a region where a location based feature should be enabled. The security filtering module 33 can use the data produced by other sensors, such as sensor B, to validate whether the sensor(s) have a value within a valid range represented by lines 580 and 581. If any of the alternate sensors, such as sensor B, sample a measurement value 530A-F that is inconsistent with the expectation measurements 520A-F, then the security filtering module 33 can report to the PEPS System that the current measurements should not allow the portable device to access the vehicle feature.

With continued reference to FIG. 6, the time interval 510A corresponds to an example of valid data. The data point 530A is between the bounds 580 and 581. At time interval 510B, an attacker has injected a sample into sensor A, but with a time delay with respect to sensor B. The security filtering module 33 compares the arrival times of 520B and 530B, the difference between the receive times 585 is computed and compared to a configurable threshold. If the difference 585 is not within some system performance and measure error bounds, the security filtering module 33 can detect that data was injected into the system. At the time interval 510C, the attacker has injected data into the sensor B ahead of the reference sensor A. The same time bounding principle applied for time interval 510B can be applied for time interval 510C. If points 530C and 520C disagree by more than the measurement capability of the system, and the difference 586 is not within a system performance and measure error bounds, the security filtering module 33 can detect that data was injected into the system.

With continued reference to FIG. 6, assuming an attacker can inject data 520D into a sensor A during time interval 510D without impacting the timing, the security filtering module 33 can use the measurement data 530D from sensor B to validate whether 520D is likely to be injected data. In the example of FIG. 6, the data point 530D is considered to be too weak because it is weaker than the threshold 581. The security filtering module 33 will judge that either point 520D or 530D is injected because the two points do not correlate to valid data points. In one embodiment, the enabling criteria 520D is received and the conditional probabilities of observing 530D are checked given measurement 520D. If the conditional probability is compared to a configurable confidence, such as mapping to RSSI lines 580/581, the security filtering module 33 can determine that the points 530D and 520D do not corroborate each other and that either 520D or 530D is invalid injected data.

With continued reference to FIG. 6, assuming an attacker can inject data into 520E into sensor A during time interval 510E without impacting the timing and sensor B is measuring a value 530E that corroborates 520E. The sensors A and B are configured to report the data contained in the packets 521 and 531. If the data 521 and 531 are not exactly the same, the security filtering module 33 can determine that some data has been injected into the system. Additionally or alternatively, to reduce the amount of data to be transferred between each sensor and the security filtering module 33, a hash 522 and a hash 532, for example a hash using a SHA-256 cryptographic hash algorithm, of the data contained in the packet can be transferred from each sensor to the security filtering module 33. If the hashes 522 and 532 do not match exactly, then the security filtering module 33 is configured to judge that data has been injected into the system.

Figure 7:
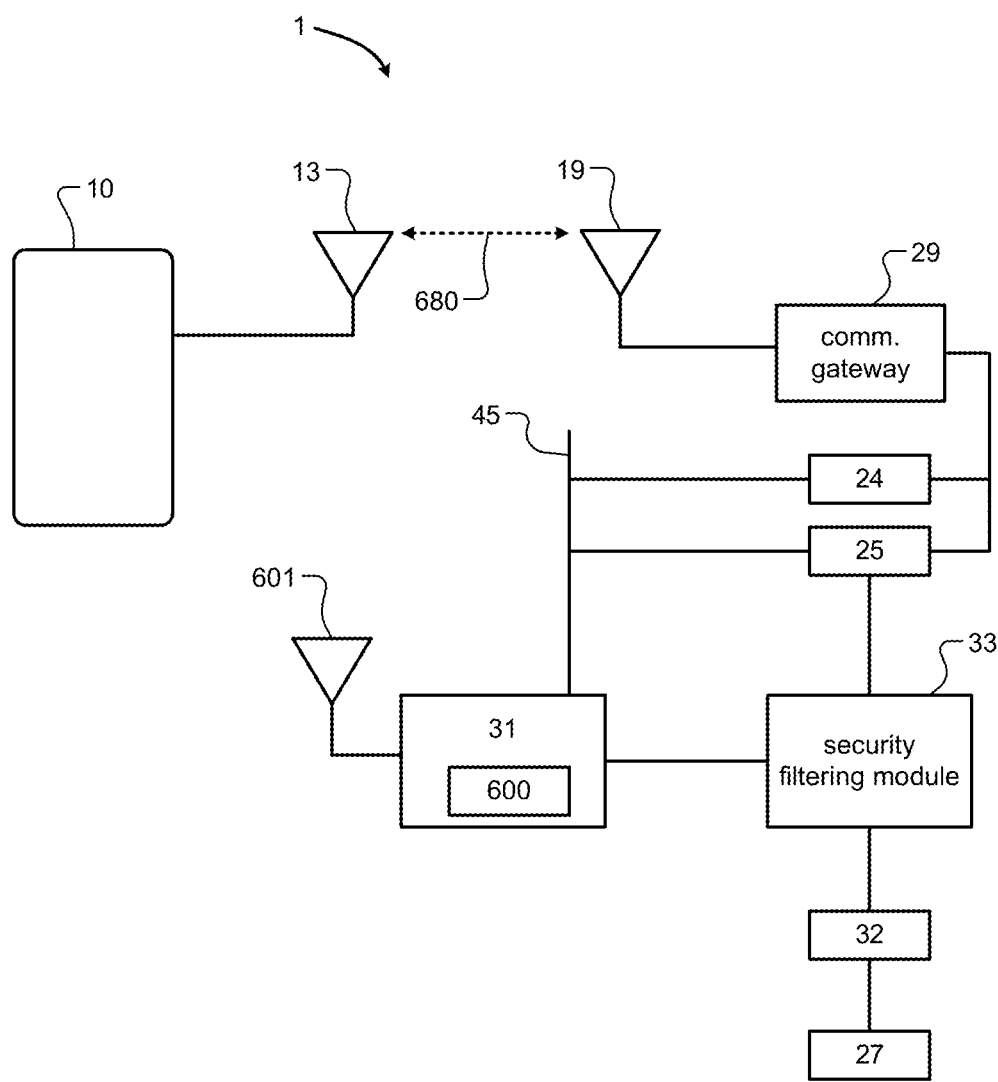
FIG. 7 illustrates a block diagram for a PEPS system according to the present disclosure.

FIG. 7 illustrates a PEPS system 1 that uses a PHY controller 600 capable of receiving BLE signals on antenna 601 of sensor 31 and that passes measured information about the packet to the security filtering module 33. The security filtering module 33, discussed above with respect to FIGS. 5 and 6, searches for violations of the physical layer and protocol as described above and filters the data accordingly before passing along the information to the sensor processing and localization module 32. The security filtering module 33 is configured to flag data as injected so that the sensor processing and localization module 32 can discard data and alert the PEPS system. The data from the sensor processing and localization module 32 is passed along to the PEPS module 27, whereby the PEPS module 27 is configured to read vehicle state information from a plurality of sensors in order to detect user intent to access a feature and to compare the location of the portable device 10 to the set of locations that authorize certain vehicle features, such as unlocking a door or trunk of the vehicle and/or starting the vehicle.

With continued reference to FIG. 7, a pre-requisite for the PHY controller 600 to collect data and measure the RSSI from the portable device 10 is a secure communication link 680, such as a secure BLE communication link, between the portable device 10 and the communication gateway 29. The communication gateway 29 is configured to share information about the secure communication link 680 between the communication gateway 29 and the portable device 10 with the connection information distribution module 24. The connection information distribution module 24 is configured to disseminate information about the secure communication link 680 to follow with the plurality of physical layer controllers 600. The physical layer controllers 600 are a component of the BLE chipset 41 found in sensor(s) 31. The connection information distribution module 24 can be, for example, any wired in vehicle communication network, such as a local interconnect network (LIN) or a controller area network (CAN). However, other communication connections or busses can be used.

With continued reference to FIG. 7, the communication gateway 29 is configured to share information about the current timing information for the secure communication link 680 between the communication gateway 29 and the nomadic device 10 with the timing control module 25. The timing control module 25 is configured to disseminate the current timing information with the plurality of sensors 31. Additionally or alternatively, in embodiments where advertising data from the portable device 10 is collected by the sensors 31, the communication gateway 29 is configured to share timing pulses with each sensor 31. In such case, the sensors 31 are configured to accept the timing information from the communication gateway 29 and to record incoming data packets relative to the timing pulses. The sensors 31 report timestamped data to the security filtering module 33, which can now establish within the accuracy bounds of the timing system if the packets between sensors were received at the same time, as discussed in detail above.

With continued reference to FIG. 7, the timing control module 25 is configured to exchange the data described below with reference to FIG. 8. The information described with reference to FIG. 8 is sufficient for a sensor 31 to find and then follow an existing secure communication link 680, provided the sensor 31 is synchronized with the communication gateway 29.

Figure 8:
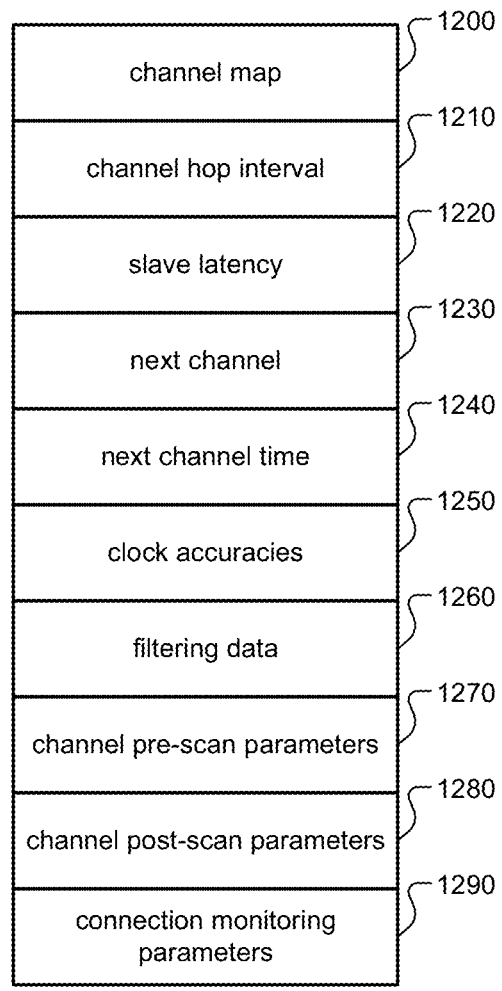
FIG. 8 illustrates information used by a sensor to find and follow a secure communication link.

With reference to FIG. 8, the communication gateway 29 can transfer the information shown as 1200 to 1290 to all sensors 31. The communication gateway can transfer the channel map 1200, the channel hop interval 1210, the slave latency 1220, the next channel 1230, the next channel time 1240, the clock accuracies 1250, the filtering data 1260, the channel pre-scan parameters 1270, the channel post-scan parameters 1280, and the connection monitoring parameters 1290. The channel map 1200 conveys to the sensors 31 which of the thirty seven connected channels and three advertising channels are to be observed. The channel map 1200 conveys the parameters that specify how the next channel is calculated. In BLE, for example, this is a simple incrementor. The channel hop interval 1210 corresponds to the connection interval defined in the BLE specification. The channel hop interval 1210 informs each of the sensors 31 how long to wait before starting the observation process on the next channel and is used to inform the security filtering module 33 and sensors 31 the expected arrival time of the next packet. The slave latency 1220 informs the sensors how many time periods, as defined by the channel hop interval 1210, the device being observed is allowed to skip communicating. Typically this value will be zero while locating the portable device 10. The next channel 1230 informs the sensors 31 the channel within the channel map 1200 that the next observation should be made on. The next channel time 1240 informs the sensors what time in the future the sensor 31 should make an observation on the next channel 1230. The clock accuracies 1250 of the devices in the system, including the portable device 10, are used by the sensors 31 to calculate the time to start observation correcting for the measurement capabilities of the system and uncertainty of timing that each device will transmit. Once the sensor 31 receives the information 1200, 1210, 1220, 1230, 1240 and 1250, the sensor can use the information to find the secure communication link 680 and start to follow the connection. The filtering data 1260 informs each of the sensors 31 how to filter the data received in the packet. Filtering data might include the expected access identifier for the connection. Filtering data might also include the minimum length of the packets or information indicating whether the packets contain encrypted data or not. Filtering data also instructs the sensors what aspects of the packet to measure, such as, most notably, the RSSI, but also timestamp, time delta from the nominal expected arrival time, channel number, whether the CRC was correct, the data in the frame, and a hash of any part of the message that could be filtered and reported to the security filtering module 610. The channel pre-scan parameters 1270 inform the sensor 31 how to observe channels looking for MITM attacker data and injection data prior to requiring observations on the secure communication link 680 before the next observation. A simple example of pre-scan parameters could be information indicating that the sensor 31 can observe early on the expected channel searching for pre-injection data. Another example is information indicating that the sensor 40 can observe on a randomly selected channel during all times when not required to make observations on the secure communication link 680 searching for packets matching a MITM attack. The channel post-scan parameters 1280 inform the sensor how to observe channels looking for MITM attacker data and injection data prior to making observations on the secure communication link 680 after completing an observation. The connection monitoring parameters 1290 includes the link supervision timeout as defined, for example, by the Bluetooth specification. The connection monitoring parameters 1290 allow the sensor 31 to determine that the connection should no longer be tracked because the connection has failed.

Figure 9:
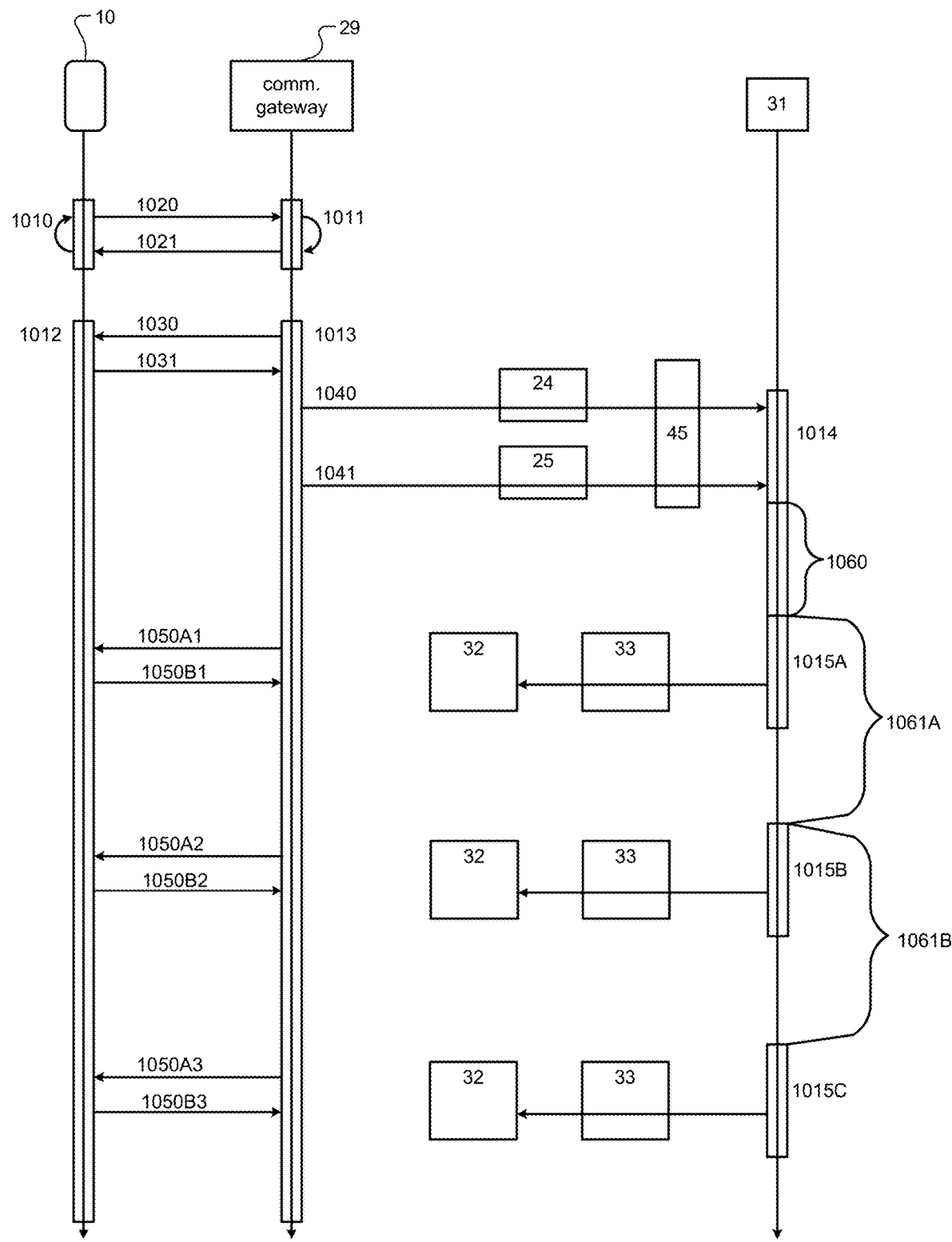
FIG. 9 illustrates operation of a PEPS system according to the present disclosure.

With reference to FIG. 9, operation of the PEPS system 1 is described. In the example of FIG. 9, the portable device 10 is configured as a BLE Peripheral. The system, however, would work equally as well if portable device were instead configured as a BLE Central. During the process 1010, the portable device 10 continues to advertise 1020, as defined by the BLE specification until a connection with the communication gateway 29 can be established in accordance with the Bluetooth specification. During the process 1011, the communication gateway 29 performs a scan portable device 10, as defined by the Bluetooth specification. Once the communication gateway 29 has discovered the portable device 10, it sends a link request 1021 to the portable device 10, in accordance with the methods defined by the Bluetooth specification. Once a connection between the communication gateway 29 and the portable device 10 is established, the process of advertising 1010 and scanning 1011 can be terminated in accordance to the Bluetooth specification.

After a communication link is established, the communication gateway 29 begins process 1013 and the portable device 10 begins process 1012 to maintain the link in accordance with the Bluetooth specifications. After the communication link is established, the communication gateway 29 is aware of all of the connection parameters for the communication link and exchanges the connection parameter information with the connection information distribution module 24 using a message 1040. The vehicle interface 45 receives the connection parameter information and passes the information to the BLE Chipset 41 of sensors 31. The communication gateway 29 communicates timing information messages 1041 to the timing control module 25. The sensors 31 receive the timing information messages 1041 via the vehicle interface 45. The timing synchronization module 44 within the sensors 31 receives the timing information messages 1041. The timing control module 25 is configured to send messages with signal 1041 containing the time to the next event as measured relative to the message itself. The timing synchronization module 44 is capable of accurately timestamping incoming messages on the vehicle interface 45 and controlling the BLE Chipset 41 to observe the necessary channels according to the connection parameters.

Figure 10:
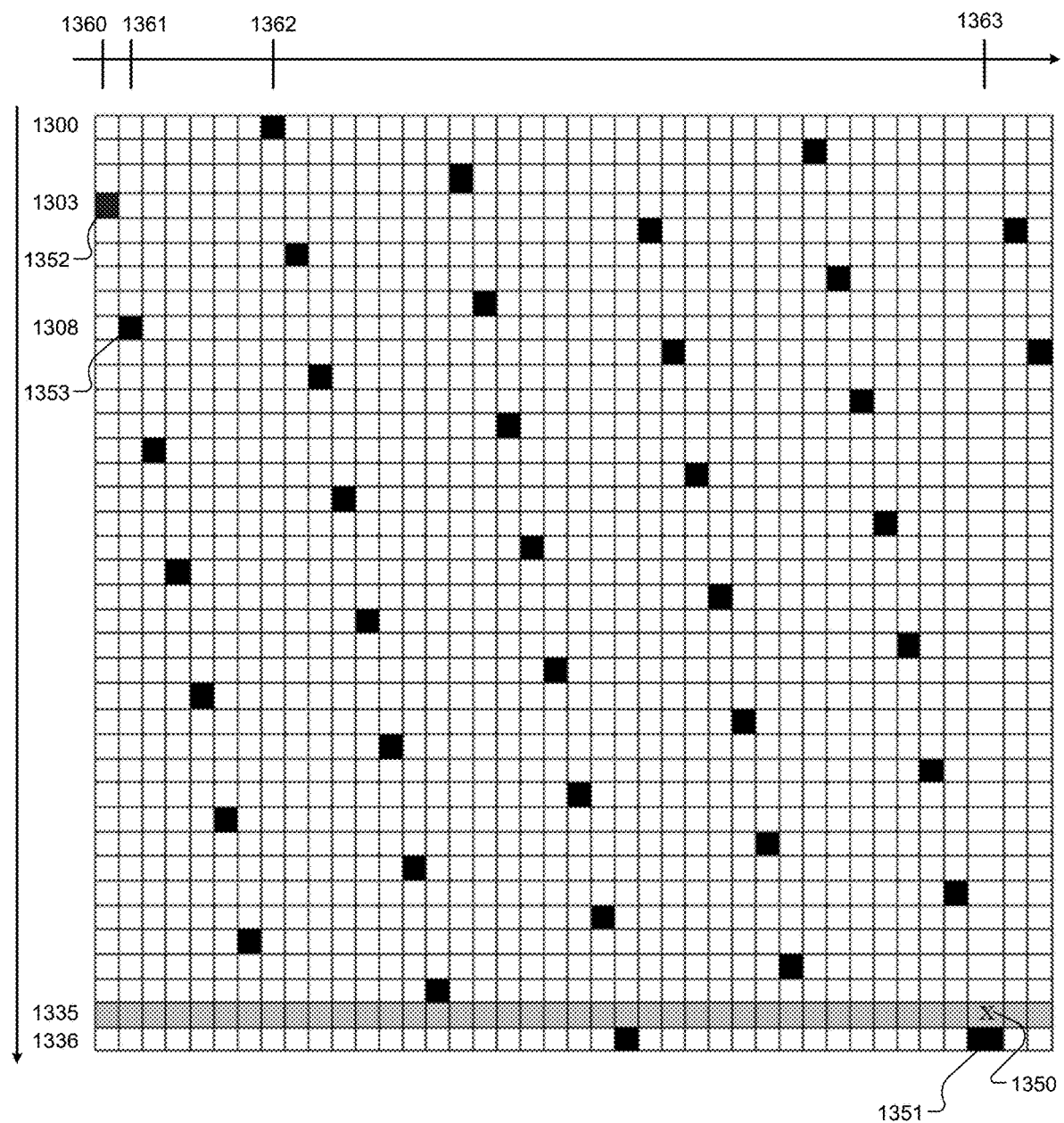
FIG. 10 illustrates an example channel hopping map according to the present disclosure.

With continued reference to FIG. 9, the sensors 31 execute process 1014 to receive incoming connection information 1040 and timing signals 1041. The sensors 31, uses the channel map reconstruction module 42 to reproduces the connection information schedule table. An example of a connection information schedule table is shown in FIG. 10, which is discussed in further detail below. The sensor 31 sets its time base relative to the timing signals 1041 and learns the time and channel of the next connection event to observe in the connection information message 1040. As such, the sensor 31 can compute the time until the next connection event 1060. The calculation of time window 1060 is corrected for the accuracy of synchronization through the timing control module 25 and clock errors of each device. The sensor 31 waits for the computed time 1060 and then begins to observe 1015A the central to peripheral communications 1050A and peripheral to master communications 1050B. The sensors 31 are configured to measure the received energy strength of each of the transmissions 1050A and 1050B. Other parameters the sensors 31 can be configured to measure include: (1) the data in each of the transmissions 1050A and 1050B; (2) mathematical derivations of the data such as hashing functions, like SHA256, for example; (3) time of arrival of 1050A and 1050B; (4) time difference of arrival of 1050A and 1050B; (5) phase angle and phase angle of arrival of each 1050A and 1050B; The scan width of 1015A is defined by the uncertainty of timing involved as well as the pre-scan and post-scan behaviors. The pre-scan and post-scan are critical for verifying that no attacker is present within the uncertainty window of the system. The information collected during observation 1015A is passed through a security filtering module 33 to the sensor processing and localization module 32. The sensors 31 then wait the connection interval time 1061A until the next connection event. The connection interval time 1060A-B is computed such that the clock accuracies, synchronization errors, and pre-scan and post-scan parameters impact the next wake up time. After the connection interval time 1061A has elapsed, the sensors 31 start observations 1015B on the next channel in the reproduced channel map. The process repeats in perpetuity until either the connection is lost or a command from the timing control module 25 commands the sensors 31 to stop following the communication link.

Figure 11:
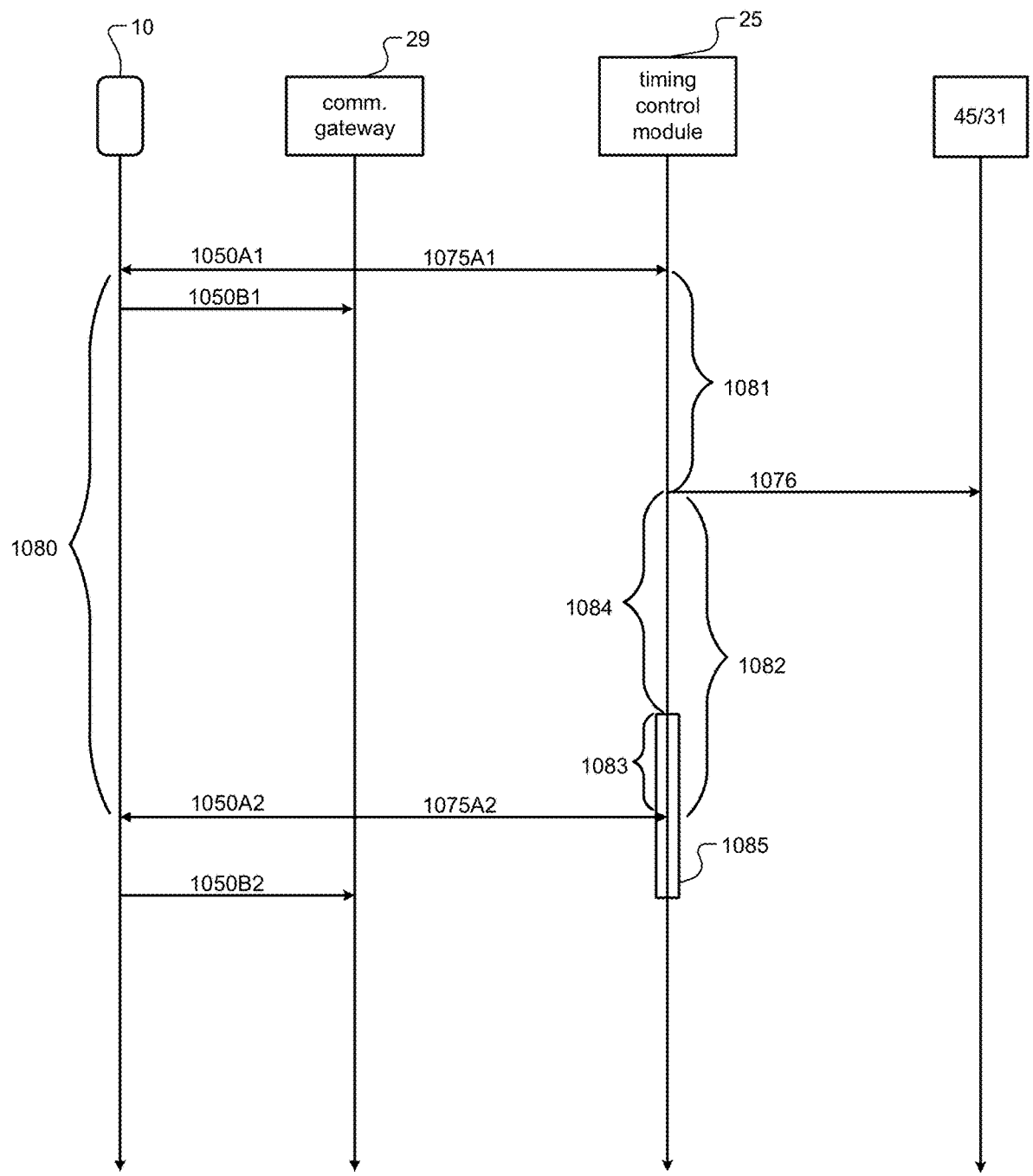
FIG. 11 illustrates a process for sensors to synchronize timing with a communication gateway according to the present disclosure.

With reference to FIG. 11, the process for the sensors 31 synchronizing their timing with the communication gateway 29 is illustrated. In the diagram there are two connection events 1050A1/1050B1 and 1050A2/1050B2. The communication gateway 29 is configured to output a timing signal 1075A1/1075A2 at each connection event. FIG. 11 illustrates the timing signals 1075A1/1075A2 at the same time as the communication from the BLE central to BLE peripheral communication 1050A1/1050A2. Additionally or alternatively, the communication gateway 29 can also be configured to output timing pulses on the BLE peripheral to BLE central communication, i.e., timing signals 1050B1/1050B2. The timing control module 25 is responsible for receiving the timing signals 1075A1/1075A2. For example, the communication gateway 29 can output the timing signals 1075A1/1075A2 as an output pulse on one of the digital pins of the BLE Chipset 41 and the timing control module 25 receives the pulse as an edge interrupt with a high speed clock and timer to create a timestamp. At a later point in time, the timing control module 25 can communicate to the sensors 31 via a message 1076. The amount of time that has elapsed 1081 from the timing signal 1075A1 to the transmission of the message 1076 is packed into the message 1076. The sensors 31 receive the message 1076 on the vehicle interface 45. The sensors 31 also have a high speed clock and timer running and the time at which the message 1076 is received is recorded. The sensors 31 extract the elapsed time 1081 from the message 1076 and subtract this value from the connection interval 1080 to calculate the time to next connection event 1082. The connection interval 1080 was previously communicated with the sensor via the message 1040, as discussed above with reference to FIG. 9. After computing the time to the next connection event 1082, the sensors 31 also compute the uncertainty of measurement by incorporating the measurement uncertainty of the timing control module 25, the uncertainty of arrival times of BLE Messages based on the sleep clock accuracies of all devices, and the connection interval 1080. The sensors 31 add the pre-scan parameter time to compute value 1083. The sensors 31 then compute a future time to start observations by taking the time to the next connection event 1082 and subtracting 1083 from this value to make the time in the future 1084 to start observations. The sensors 31 use a timer to start an observation process 1085 after the time period 1084 elapses.

Figure 12:
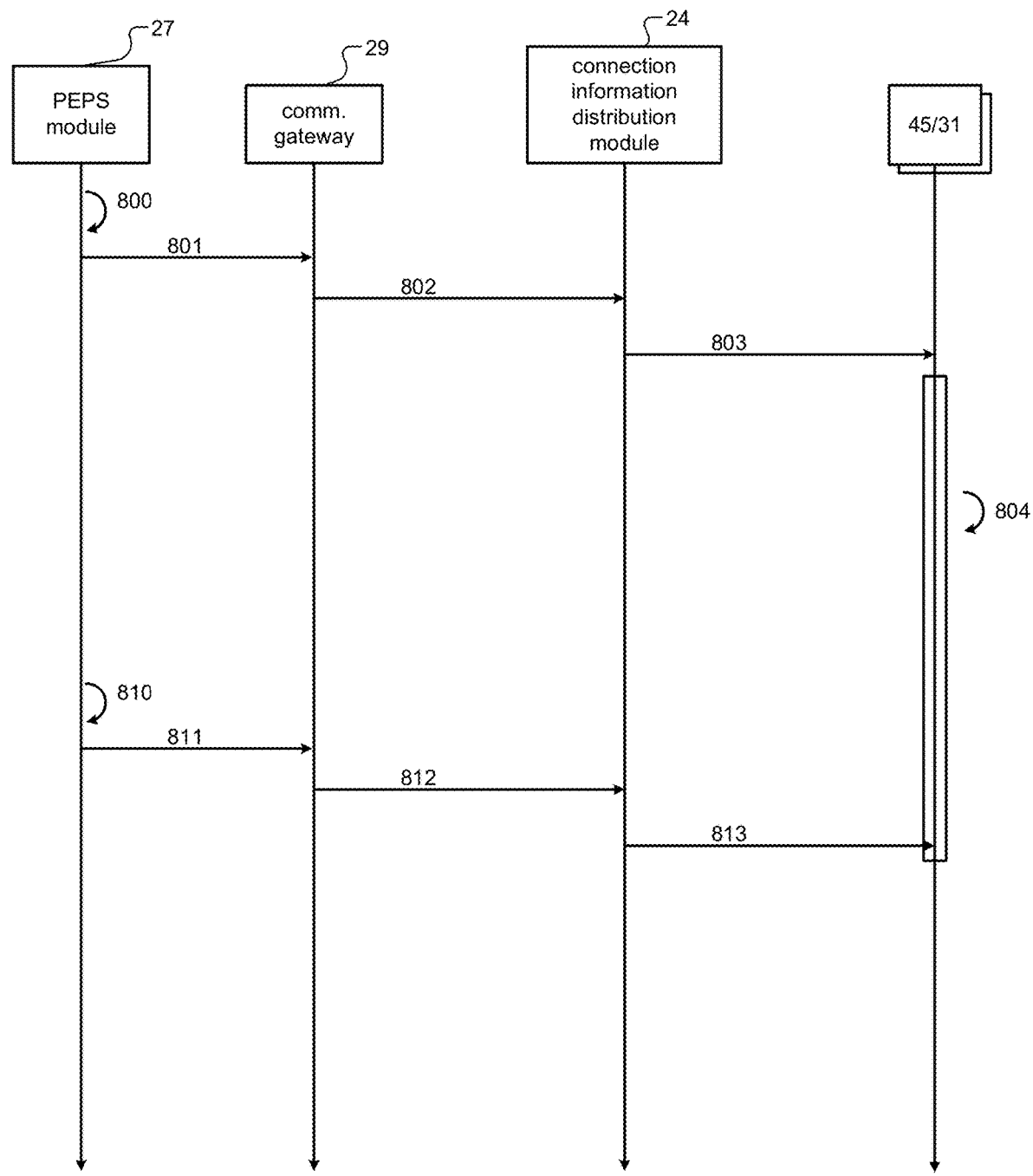
FIG. 12 illustrates a process for a PEPS module to configure and control a sensor network and to start and/or stop following connections according to the present disclosure.

With reference to FIG. 12, the process for the PEPS module 27 to configure and control the sensor network and to command the plurality of sensors 31 to start and/or stop following connections is illustrated. The PEPS module 27 detects that a link should be followed 800 and sends message 801 to the communication gateway 29 indicating that a link should be followed. The communication gateway 29 then retrieves and sends the link information to the connection information distribution module 24. The connection information distribution module 24 uses the vehicle interface 45 to transmit a message to the sensors 31 being targeted.

With reference again to FIGS. 1, 2, 3, and 9, a sensor 31 can include a channel map reconstruction module 42 that is configured to reproduce the connection timing for a secure communication link 680 using connection information signals 1040 and timing signals 1041. An example of a channel hopping map is shown in FIG. 10. In FIG. 10, for example, the columns 1360-1363 from left to right represent time increasing connection events. The time that elapses between each column is the connection interval described the channel hop interval 1210, discussed above with reference to FIG. 8. In this example, the channel hop interval 1210 is equivalent to the time elapsed between any two adjacent columns such as 1360 and 1361. It should be noted that the channel hop interval 1210 should be viewed as any deterministic process to determine future channel times and should not be limited by the static connection interval utilized by BLE. For instance, the channel hop interval 1210 could include the deterministic pseudo random channel hopping of classic Bluetooth. Each row 1300-1336 represents a channel number. A channel 1300-1336 is one of the BLE channels as defined by the Bluetooth Specifications and is two MHz wide. The example in FIG. 10 shows 37 channels, one for each of the connection channels. However, it should be understood that the systems of the present disclosure can enable the sensors 31 to follow any channel that can be described in terms of the data contained in FIG. 8. The channels that should be used are learned by the sensor 31 based on the channel map 1200 that was received by the sensor 40 in message 1040, discussed above with reference to FIG. 9. In the example described in FIG. 10, the channel represented by row 1335 is not used. Further, a black box, as indicated by 1351-1353, represents a commitment for the PHY Controller 600 of the BLE Chipset 41 in a sensor 31 to observe the channel mapped by the row 1300-1336 at the time mapped by the column. It is not necessary for message 1040 to contain all the channels and times for the channel map reconstruction module 42. The channel map reconstruction module 42 accepts the inputs that the BLE peripheral would require to produce the connection event schedule map in accordance with the Bluetooth specifications and the next channel to communicate 1230, exemplified as channel 1303 to synchronize the sensor's current time base to that of the connection. This channel is set to index 0 1360 of the map. The channel map 1200 includes the deterministic channel hopping scheme. In BLE, the channel hopping scheme is a simple incrementor defined by the BLE specifications as the "hopincrement." As exemplified in FIG. 10, the hopincrement is five, which represents the amount that current channel will be incremented each connection interval. For example, in FIG. 10, the channel is advanced by five from 1352 to 1353 as the time is incremented one connection interval from 1360 to 1361. The BLE channel hopping scheme as defined by the Bluetooth specification includes a modulus operation that allows the channel index to wrap around the bottom of the table as shown at time interval 1362. The channel hopping scheme also allows for empty channels 1335 to be skipped over. For example, as shown in FIG. 10 channel 1335 is skipped at point 1350 and channel 1336 is instead sampled at point 1351. The channel with index 35 1335 is not in use. The BLE specification provides a method to remap, as noted, for example, in Section 4.5.8.2 Channel Selection of the Low Energy Link Layer specification version 4.2.

With continued reference to FIGS. 8, 9, and 10, the channel pre-scan parameters 1270 and the channel post-scan parameters 1280 describe the behavior of the PHY Controller 600 during the time intervals between the time windows represented by the columns in FIG. 10. The clock accuracies 1250 enable the BLE Chipset 41 to widen the time interval for each of the black boxes 1351-1353 to accommodate for the uncertainty of both measurement and transmission times of each device in the system. Initially, the sensors 31 are not synchronized to the secure communication link 680. Upon receiving the timing signals 1041, next channel 1230, and next channel time 1240, the sensors 31 have enough information to synchronize their time base with the connection and determine the future time of a communication as measured by the sensor 31 on the next channel time 1240 with respect to the timing of the secure communication link 680.

Figure 13:
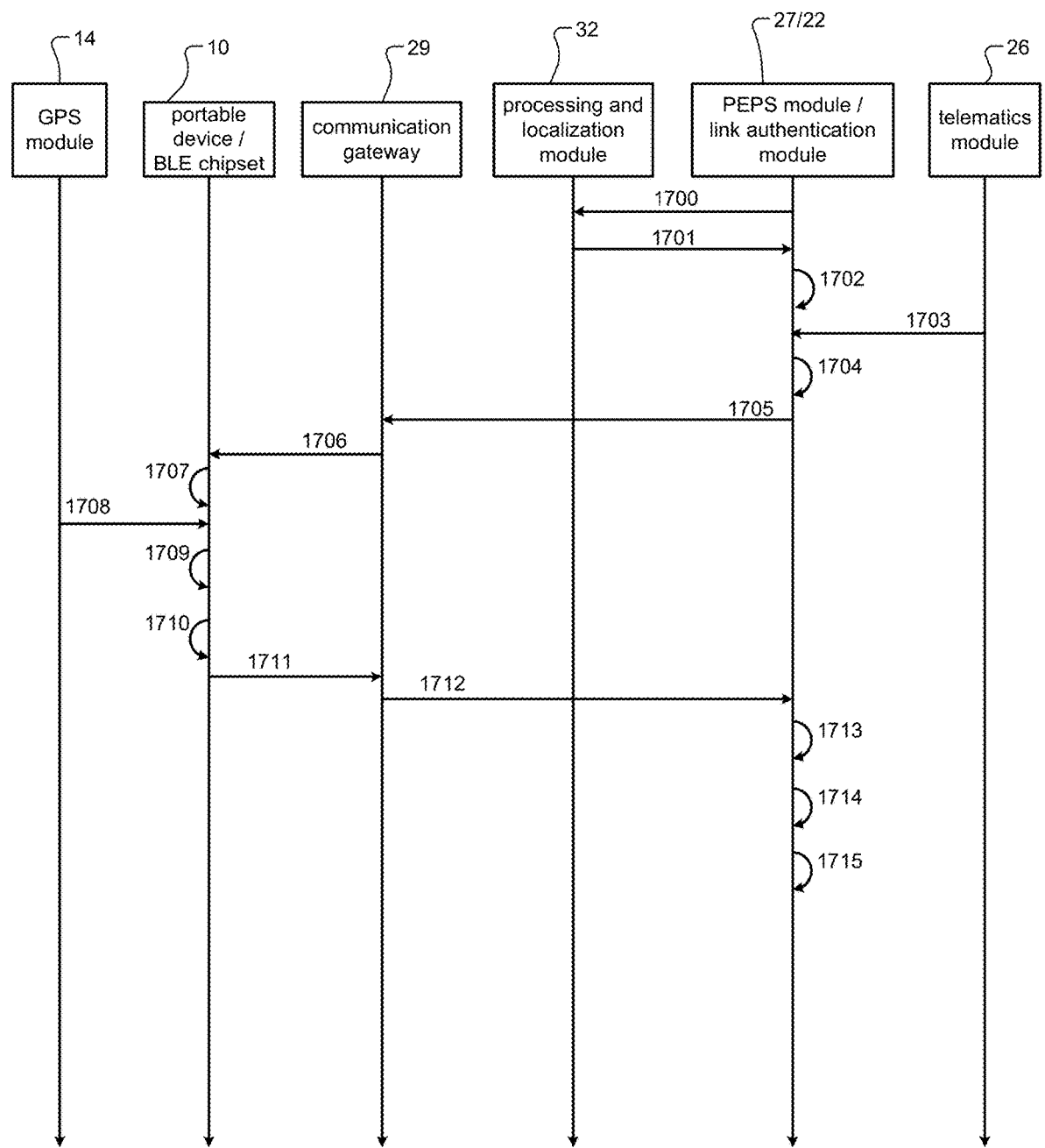
FIG. 13 illustrates an authentication method according to the present disclosure.

With regard to FIG. 13, an authentication method is described. The authentication method is trigged by a user action detected by the vehicle 30, described in FIGS. 1 and 2. For example, the PEPS module 27 detects a user action such as the grabbing of a door handle or the pressing of a button as typically found in modern vehicles. In the example of FIG. 1, the PEPS module 27 includes the link authentication module 22. Alternatively, the PEPS module 27 and the link authentication module 22 can be implemented as separate modules, as shown in FIG. 2. Additionally or alternatively, all of the described signals can be directed into the communication gateway 29, allowing for alternate configurations. The PEPS module 27 must make a determination regarding secure access to the feature based on the location of the portable device 10 and the security information that the portable device 10 can provide. For example, a challenge—response mechanism can be used, similar to current PEPS systems implemented using LF and RF systems.

With continued reference to FIG. 13, the PEPS module 27 detects an intent to access a vehicle feature by way of a sensor. The PEPS module 27 then maps the request to a zone id and sends a request 1700 to the processing and localization module 32 to determine whether any portable device 10 is within a zone id of the vehicle 30. The processing and localization module 32 responds to the PEPS module 27 with response 1701 indicating a list of portable devices that are localized in a region that could have access to the vehicle feature corresponding to the zone id. At 1702, the PEPS module 27 checks the list of portable devices to determine if the devices are paired with the system. For each valid portable device, a set of encryption information is retrieved for the portable device. This is referenced as the Encryption Key, such as the commonly used advanced encryption standard (AES) encryption key. Additionally or alternatively, counter values can be implemented by asymmetric public/private keys. At 1703, the PEPS module 27 acquires the current vehicle location (coordinates) in latitude/longitude from the telematics module 26. The location can include error bounds based on the current measurement accuracy of the vehicle system. The PEPS module 27 then embeds the latitude and longitude of the vehicle 30 into a message and encrypts the challenge message at 1704 using the security information retrieved at 1702. The challenge data produced at 1704 is transferred to the communication gateway 29 at 1705. The communication gateway 29 then transmits, using BLE, at 1706 to the portable device 10. An application executing on the portable device 10 decrypts the challenge message at 1707. The application executing on the portable device 10 obtains the location coordinates at 1708 of the portable device 10 in latitude and longitude, with optional location accuracy information. The application executing on the portable device 10 then performs a mathematical operation at 1709 on the coordinates of the portable device received at 1708 and the coordinates of the vehicle 30 (sent at 1703), as received from the communication gateway 29. The mathematical operation at 1709 is known as the challenge response. An example of a mathematical operation at 1709 can be to compute the distance between the two coordinates. Another example of the mathematical operation at 1709 is to compute an exclusive or (XOR) of the two sets of coordinates, recited at 1703 and 1708. Yet another example of the mathematical operation at 1709 is to compute the bearing from the vehicle's coordinates from 1703 to the portable device's coordinates from 1708. Once the value from the mathematical operation at 1709 is obtained, the application executing on the portable device 10 can then pack a message with the value of the mathematical operation at 1709 as well as the coordinate information from 1708 of the portable device 10 and encrypt the packet at 1710 using the key required to communicate with the communication gateway 29. The portable device 10 can then transmit at 1711 the encrypted message from 1710, using BLE, to the communication gateway 29. At 1711, the communication gateway 29 receives the encrypted message from 1710. At 1712, the communication gateway 29 transfers the encrypted message from 1710 to the PEPS module 27. At 1713, the PEPS module 27 decrypts the encrypted message from 1710 using the key appropriate for communication from the portable device 10. The PEPS module 27 then extracts the coordinates of the portable Device 10 from 1708 and the portable device's computed challenge response from 1709, and computes the same mathematical operation on the coordinates from 1703 and 1708. The result of the operation is then compared to the purported challenge response contained in the encrypted message at step 1714. The PEPS module 27 then compares the challenge response to an acceptance criteria at 1715. For example, the acceptance criteria could indicate that the value must be less than some threshold or within some bounds to be acceptable.

The vulnerabilities of an advertising based system are primarily caused by two factors. First, advertising channels for BLE are designed to be very predictable and easily discovered, allowing for any BLE device without special software to be able to discover nearby advertisers and to clone and mimic the data. Second, the advertising channels implement an inherent jitter to avoid collisions of messages, therefore it is difficult to build a system whereby the authenticity of an advertising packet by the reception time can be verified without making special modifications to the system, which are not covered by the BLE specification. Advertising packets may contain special application specific security information, but the loose tolerances on expected arrival time of advertising data makes reliance solely on cryptographic techniques necessary.

The present disclosure provides methods of accurately conveying timing information from the communication gateway 29 with sensors 31 and provides a security filtering module 33 that makes decisions on the timing of signals and cross correlation of sensor values to validate whether an injection scenario is likely. Although the present disclosure uses examples of connected data, the security filtering module 33 of the present disclosure could be equally applicable for use to validate the timing of advertising data.

The previously noted US Pub. No. 2014/0188348 A describes a method to use connected data, whereby the portable device connects to each sensor individually. This design has several inherent disadvantages. For example, there are significant requirements placed upon the portable device in order to form and maintain connections with the plurality of sensors. For example, there could be too many sensors in the network for the portable device to connect to each, given the additional communication and processing time required.

With reference again to FIG. 1, the PEPS system 1 of the present disclosure includes the vehicle 30 and a portable device 10. The portable device is a Bluetooth-enabled device capable of supporting the BLE protocol. The Bluetooth technical specifications are developed and published by the Bluetooth Special Interest Group (SIG).

Without limitation, the portable device 10 may be any Bluetooth enabled communication device such as a smart phone, smart watch, wearable electronic device, key fob, tablet and so on. The portable device 10 may incorporate other wireless technologies such as WiFi, Impulse Radio that can be used to communicate with the vehicle 30. While the present disclosure provides examples using Bluetooth communication, the systems, methods, and architecture of the present disclosure can be implemented using other applicable communication protocols, other authentication systems or methods, or other fine grained localization. As such, the systems, methods, and architecture of the present disclosure is not limited to the BLE communication protocol. Further, the systems, methods, and architecture of the present disclosure are applicable to any communication protocol that uses a Frequency Hopping Spread Spectrum (FHSS) whereby the communication gateway 29 can share the information necessary to reconstruct the channel map and timing information with the sensors 31.

The vehicle 30 includes a set of modules 20, either as a single controller or distributed throughout the vehicle 30 and a plurality of sensors 31 that can communicate with the control modules 20 either wirelessly via Bluetooth or via traditional vehicle wired connections such as Local Interconnect Network (LIN) or Controller Area Network (CAN). The vehicle 30 is capable of knowing its current location and error of location via a telematics module 26 that implements any of GPS, Inertial Navigation System, GSM signal location, etc. Vehicle information can be collected by a data management layer 23 and shared with the portable device 10. The data can include the current Latitude/Longitude of the vehicle 30 as well as the uncertainty measure of the current location each link session.

The communication gateway 29 includes a BLE Chipset 21 and a link authentication module 22. The link authentication module 22 is capable of authenticating that the portable device 10 is the same device that has been previously paired to the communication gateway 29. The pairing process and authentication method are specified by the Bluetooth special interest group (SIG).

The BLE Chipset 21 is capable of generating and receiving signals compliant with the Bluetooth specification using the antenna 19.

Each Sensor 31 includes a BLE chipset 41 capable of generating and receiving signals compliant with the Bluetooth specification using antenna 43. The BLE chipset 41 contains a channel map reconstruction module 42 capable of reproducing the channel map of an existing connection between the portable device 10 and the communication gateway 29 using the FHSS information received from the vehicle modules 20 on the vehicle interface 45. All BLE chipsets 41 implement accurate time keeping necessary for following BLE connections and tuning into the correct frequencies, but are not capable of tuning into connections to which they are not synchronized or have lost synchronization. The sensors 31 include a timing synchronization module 44 that is capable of receiving timing signals from the timing control module 25. The timing control module 25 keeps the plurality of sensors synchronized with the connection intervals of communication between the communication gateway 29 and the portable device 10.

The communication gateway 29 and portable device 10 establish connections as governed by the Bluetooth core specification by way of one the devices advertising and the other device scanning. After communication is established, both the communication gateway 29 and the portable device 10 must follow a channel map, and channel hopping scheme that the devices agree upon at the time the communication link is established. FIG. 10 shows an example of a channel hopping map for illustrative purposes. The channel hopping map contains all the information necessary for the communication gateway 29 and portable device 10 to communicate with each other on the correct frequency channel at the correct time in the future. Although not impossible for an observer to deduce the channel hopping map, in most practical applications, the channel hopping map is considered private and unique for this particular communication. Using the example of BLE channel maps, under the Bluetooth specification, a unique number is assigned to identify the link, known as the access identifier. The systems, methods, and architecture of the present disclosure are for disseminating the channel hopping map to sensors 31 in a network so that each sensor 31 may follow a FHSS communication. As such, the systems, methods and architecture of the present disclosure can be generalized to any FHSS protocol.

After a link between the portable device 10 and communication gateway 29 is established, the link authentication module 22 can establish the authenticity of the link. The Bluetooth SIG defines the method by which the link can be secured by checking against previously stored security information that was exchanged between the vehicle 30 and portable device 10. The link authentication module 22 may require additional information beyond what the Bluetooth SIG defines in order to authenticate the link. Embodiments may use only the link authentication method specified by the Bluetooth SIG or may use additional security mechanisms. The present disclosure is not limited to a particular method by which the link is authenticated. After link authentication is established, the data management layer 23 collects the current location of the vehicle 30 from the telematics module 26 and shares the location with the portable device 10. The portable device 10 optionally contains a GPS module 14, such as those provided by Apple iOS and Google Android OS. The application software 12 executing on the portable device 10 can compare the estimated relative location of the portable device 10 to the vehicle 30. Based on the estimated position of the portable device 10 relative to the vehicle 30, the portable device 10 can send signals to the communication gateway 29 requesting the vehicle to perform certain actions.

As discussed above, traditional systems use open advertising channels for RSSI measurement. These systems, however, can be insecure because advertising data is communicated on public and easily sniffable channels. As such, an injection attack could be mounted using a freely downloadable phone application. Traditional systems do not address how to handle such security vulnerabilities apparent in using advertising data. Moreover, using advertising data is highly energy inefficient. In such systems, the key fob must communicate securely with the central node and also exchange advertising data with a plurality of sensors. This causes a lot of unnecessary transmissions and receptions, ultimately degrading the power performance of the system. In some systems, several connections can be formed with each of the sensors. Also, in this situation there is a significant increase in the amount of transmission and receptions required to both initiate and maintain the links with each sensor. Although this largely addresses the privacy and injection concerns with advertising, it is still highly inefficient and poses new security risks because there is no disclosed method to prevent attacks by falsely connecting to sensors to inject stronger signals.

The present disclosure is directed to providing passive eavesdropping capabilities to a plurality of vehicle sensors. The eavesdropping nature of the sensors in the network provides a number of advantages for implementation of a BLE PEPS system. For example, the smart phone/key fob only needs to expend the energy necessary to communicate securely with the central communication gateway. There is no additional energy expenditures required for the purposes of communicating with each sensor separately. In addition, by using only one communication channel, with very well understood tight timing constraints, protocol checksum, etc., security can be drastically increased. An attacker cannot inject falsified data into the existing link without interfering with the link. For instance, it is very difficult for an attacker to know beforehand priori what data will be exchanged until it is observed. An attacker can only know the channel and timing. Injecting a signal onto that channel would interfere with the BLE protocol leading to errors, most likely CRC/checksum errors that would cause the packet to be discarded and no measurement taken. In addition, use of advertising data can sometimes be considered a privacy concern. For example if the smartphone is advertising all the time, it is easy for someone with a large sensor network to track where the phone is going. It is advantageous for the smartphone to not be required to advertise to use the PEPS system.

As discussed, the systems, methods, and architecture of the present disclosure include a communication gateway 29, such as a BLE gateway. The communication gateway 29, for example, can include any device that is capable of communicating securely with a portable device 10, such as a smart phone, a tablet device, a key fob, a wearable device, such as a smart watch, or other BLE communication device. The communication gateway 29, for example, can be integrated into a dedicated short-range (DSRC) communication module. Alternatively, the communication gateway 29 can be integrated into an LTE communication module. The communication data between the communication gateway 29 and the portable device 10 is encrypted, so it is known to be private, and signed, so the authenticity of the data can be determined (not forged). The communication data is made replay safe by using, for example, counter based encryption, real time token exchange, and/or time stamp information.

The portable device 10 and the communication gateway 29 go through a pairing process to establish a trust relationship. The pairing process can include: Bluetooth pairing, as described by Bluetooth specification; pairing whereby additional security information is exchanged between the vehicle system and the phone using the phone and vehicle interfaces; pairing whereby device addresses, device Identity resolving keys, reservation IDs and encryption keys are exchanged via a cloud infrastructure; and/or pairing whereby a certificate to use the vehicle is presented to the vehicle where the certificate is signed by the vehicle owner's device and or a trusted security signing authority such as the vehicle manufacturer or trusted third party. In the case of a certificate, the certificate can contain the restrictions in use cases (i.e., geo fencing, valet mode restrictions), validity period, whether reporting back to the owner about driving performance/behavior is required, etc.

As discussed above, the systems, methods, and architecture of the present disclosure include one or more BLE sensors 31. Each sensor 31 is capable or measuring some physical phenomena of a received BLE signal characteristic. For example, the sensors 31 can measure RSSI, angle of arrival, time difference of arrival, or other characteristics of the received signals.

The sensors 31 can be placed within or upon the vehicle body in locations such certain physical phenomena can allow meaningful decisions to be made about the location of the portable device 10 relative to the vehicle. For example, the physical phenomena can include free space signal loss, scattering, multi-path fading, time of propagation and the time differences of propagation, angle of arrival difference because of propagation.

With reference again to FIGS. 1 and 2, each sensor 31 can communicate with the communication gateway 29. The portable device 10 can communicate with the communication gateway 29, for example, on advertising channels or on a connected channel, as part of a BLE communication link. Each sensor 31 is able to passively eavesdrop on the communication between two connected devices, such as the communication gateway 29 and the portable device 10. Additionally or alternatively, in the case of wearable device, the eavesdropping could be between the portable device 10 and a wearable device, such as a smart watch, associated with the portable device 10. Each sensor 31 is capable of selectively disabling and then re-enabling eavesdropping, i.e., the procedure of following a connection, in order to save power. The communication gateway is able to control which sensors 31 are eavesdropping.

Further, the communication gateway is able to provide the necessary information to each sensor 31 in order for eavesdropping to be resumed. The necessary information for eavesdropping can include, for example, an access identifier for the BLE communication link, which uniquely identifies the communication between the communication gateway 29 and the portable device 10. Each communication packet will contain the access identifier data as the pre-amble. As such, the information can include information about how to decode the pre-amble. The information can also include a channel map currently being used so the sensors 31 know what set of channels to use when eavesdropping. The information can also include information about the channel hopping scheme, so that the sensors 31 know how to jump from one channel to the next. Many wireless communications standards implement a channel hopping that is deterministic if some basic parameters are known. In BLE, the sensors 31 must know the current channel, the channel map, and the channel hop number in order to determine the next channel to hop to. The information can also include information needed to find a future connection event, such as the next communication channel, and/or a future communication channel with an approximate time for the communication event.

Each sensor 31 is capable of listening on a connection channel just prior to a connection event, so as to collect physical phenomena as described previously, i.e., RSSI, timestamps, angle of arrival, etc., as well as all data contained in both the master's and the slave's communication packet.

One consideration for the connection following systems, methods, and architecture of the present disclosure is the synchronization of schedule tables. Because all of the communication information required for two devices that are in the process of connecting is broadcast in a freely observable format, any BLE communication node that happens to witness or eavesdrop on a connection being formed can derive the schedule table and, therefore, can scan for communications in a passive eavesdropping mode. However, it is power intensive to have sensors constantly following all connections. As such, it can be beneficial to have a system that can selectively enable and disable connection following, although a synchronization issue can arise, given that each of the sensors have lost the ability to scan on the correct channels at the correct times. For these reasons, the systems, methods, and architecture of the present disclosure utilize synchronization algorithms to coordinate communication and eavesdropping on communications by the sensors 31.

For example, a message is sent from the communication gateway 29 to each of the sensors 31 that must start following a communication connection. This message contains the information needed by the sensors 31 to decode a communication packet, which, in simplest form, can include sending the access identifier that identifies the link ID, which is fairly robustly unique ID for any given region. At some point prior to the request by the communication gateway 29, information about the link has been communicated or transferred to the sensor 31. As described above, this can include the channel map, channel hop number, connection interval, slave latency, as well as the sleep clock accuracy settings of all devices.

Figure 14:
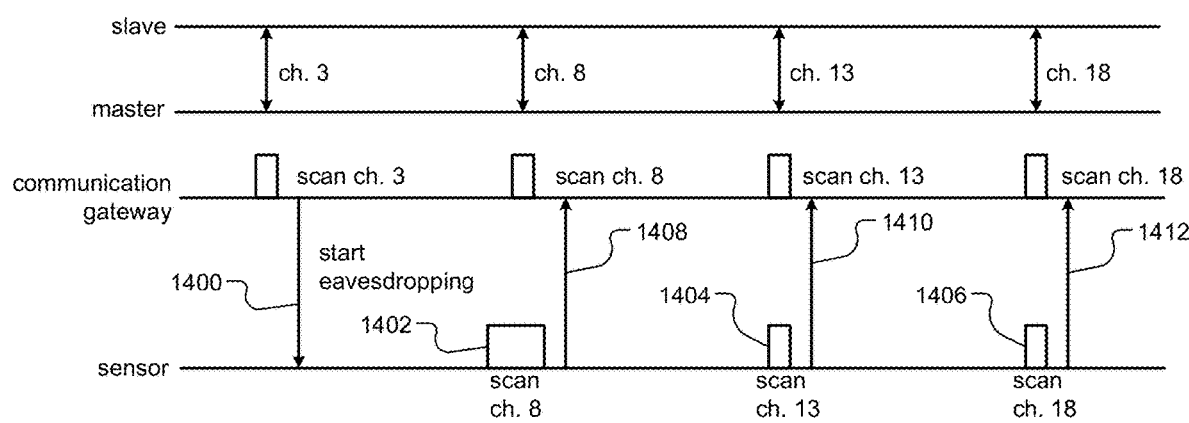
FIG. 14 illustrates a timing diagram for communication between a slave, a master, a communication gateway, and a sensor.

With reference to FIG. 14, master and slave devices are shown as communicating with a communication interval, such as 100 ms. The devices use all channels and channel hop by 5 channels. The current or starting channel is channel 3. In the example of FIG. 14, the slave latency is zero, so the slave always communicates.

At 1400, the communication gateway 29 issues a command to one or more sensors 31 to start eavesdropping. The start eavesdropping command contains all of the information required for the sensor 31 to start scanning on the correct channel and to follow the correct channel hopping scheme. Initially, the sensor 31 must start listening on the channel slightly early, as indicated at 1402, so that it can detect the communication between the devices. On subsequent connection events, such as 1404 and 1406, the scan intervals can be reduced to shorter durations, based on the clock accuracies of all devices. The sensors 31 can share data measured about the signals and connection events with the communication gateway 29, as indicated at 1408, 1410, and 1412.

U.S. Pat. No. 9,123,244, titled Vehicle Tracking of Personal Devices with Response System, issued Sep. 1, 2015, describes a method for tracking an object through a system onboard a motor vehicle. The method includes detecting a wireless device, determining a position of the wireless device, recognizing the position of the wireless device relative to the vehicle, analyzing the position of the wireless device with respect to predefined conditional statement and activating an alert according to the satisfying of the predefined conditional statement. U.S. Pat. No. 9,123,244 is incorporated herein by reference in its entirety.

U.S. Pat. No. 9,123,244 describes a system capable of tracking a device proximate to a phone and proximate to a vehicle. The present disclosure extends the example use cases described in U.S. Pat. No. 9,123,244 with the use of the connection following systems, methods, and architecture described above.

The disclosure of U.S. Pat. No. 9,123,244 describes the delegation of a digital key from a user's smart phone or key fob to a wearable device, such as an activity monitor or smart watch, i.e. a FitBit or Apple Watch. For example, in a use case for the systems and methods described by U.S. Pat. No. 9,123,244, a driver arrives with a vehicle at a park and wishes to go jogging. The driver does not want to carry their vehicle keys or smart phone with them and wants only to take their smart watch on the jog. However, the vehicle keys and smart phone devices are not safe to leave in the vehicle because they are enabled as the key for the vehicle. If a robber, for example, breaks into the vehicle, they could potentially steal the entire vehicle.

The disclosure provides a method to temporarily disable the keys so that they are safe to leave inside the vehicle until after the user returns from the jog. Whereby the user can securely access the vehicle and re-arm the phone and key fob again.

In the present disclosure, the systems, methods, and architecture of U.S. Pat. No. 9,123,244 can be extended so that the Key Fob (whether using BLE, LF, RF, etc.) can also be located proximate to a phone. As such, the systems, methods, and architecture described in U.S. Pat. No. 9,123,244 can be extended to include that the phone can also detect things such as a link status with a device, such as a smart watch or exercise device, such as a FitBit, and make this information available to the decision making system of the vehicle.

For example, when the watch returns after the jog, the phone can detect that a secure link with the watch has been re-established. Reporting this information to the vehicle system is critical to the decision of whether to authorize the user to enter the vehicle after returning from their jog. Such information must include information indicating whether the link is secure/bonded and information indicating whether security data associated with the link can be verified.

The present disclosure, for example, provides additional features to the system described in U.S. Pat. No. 9,123,244 to ensure that the device it is tracking is the device that is trusted and not an attacker. For example, security information can include a personal identification number (PIN) that the user must enter on their watch when they return from the jog to enter the vehicle and disarm the system. For further example, security information can also include the secure pairing information between the smartphone and the watch, i.e., the watch and the phone have encrypted their link and the phone can trust that the watch is the authorized watch. Existing smart watches, for example, include systems for encrypting a communication link with a phone because of the sensitive data that is exchanged between watch a phone. Once the security layer between the smartphone's operating system (OS) and the smartwatch has been achieved, this can be reported to the vehicle for use in trusting that the device that will be tracked is a trusted device. Security information can also include a token that the smartphone shares with an application running on the smartwatch. When the smartwatch reconnects, the smartphone can ask the watch application to produce the token, thereby verifying that the smartwatch is the same device that authorized the delegation mode in the first place. Security information can also include the GPS location of the smartwatch proximate to the vehicle and proximate to the smartphone. This can reduce the likelihood of a relay attack, whereby the security information above is not known to an attacker, but can be gated although the smartwatch is too far from the vehicle. The GPS range for example can broadly include latitude/longitude coordinates of a device. Smartphones and smartwatches can also estimate their location by presence of WiFi networks and through cellular data. Therefore, the location of the smartphone and smartwatch must be compared, with the relative accuracy kept in mind. If GPS precision is not available with sufficient accuracy to eliminate a relay station attack, then the system can ask for some manual input from the user, such as an alert, where they have to acknowledge the system has detected them nearby the vehicle, but without sufficient accuracy to automatically disable. The alert, for example, can reuse the smartwatch's security model whereby if the watch has been continuously worn by the user it is safe to avoid entering a PIN. In cases where the smartwatch may have been removed, then the user may then have to manually activate some interface on the wearable. The rules for the systems and methods can include disabling of certain features until some condition is met, i.e. disarm PEPS on a certain device, such as a smartphone or key fob, until the watch returns.

Using an interface either on the smartphone, on the smartwatch/activity monitor, or on one of the vehicle's displays, a user can configure a rule that causes the PEPS system to ignore devices, such as the key fob and smart phone located in the vehicle while on the jog. For example, an interface both on the smartphone and on the smartwatch can be used to enter a "delegation mode," whereby any key fob/smartphone that is presently located nearby the vehicle is disabled for purposes of operating the PEPS system when the delegation mode is entered. The interface can allow the user to select a list of devices enabled, but by default all nearby devices can be disabled. The user then can lock the vehicle doors using the smartwatch, with the smartphone and key fob left safely inside the vehicle, and preferably not visible inside the glove box to reduce the likelihood of a break in. The user can then go for a jog and the system can detect that the watch has now left the proximity of the vehicle. The first part of the rule whereby the user is expected to go for a job is now satisfied. At this time, the system can then track that the phone is leaving the vicinity of the vehicle and if a security key, such as a key fob and or smartphone, has been left in the vehicle, the system can trigger an alert to the user that the delegation mode will be enabled, or that the user should return to the car to retrieve the device that is enabled as a key, in the case of an accidental forgetting of a key within the vehicle.

Once the user leaves for a jog, for example, wearable device, such as the smartwatch, leaves the communication connection range with the smartphone that has remained inside the vehicle. The smartphone can then report the loss of the communication link, as described by U.S. Pat. No. 9,123,244 with respect to processing of rules against loss of secure link. The wearable device can typically start broadcasting on advertising channels in order to re-establish a link to the smartphone. Additionally or alternatively, the roles could potentially be reversed, however, whereby the smartphone will broadcast on advertising channels. Because the smartwatch and smartphone are out of range from one another, no interesting activity with respect to activating vehicle features will likely detectable by the vehicle system. The vehicle, however, could detect an advertising communication from the wearable due to better antenna design and placement when compared to the smartphone.

Continuing with this example, the user continues with the jog and returns within the communication range of the vehicle system and the smartphone, located within the vehicle, that the wearable is associated with. At this time the wearable, for example, can be broadcasting on the advertising channels and the smartphone can be scanning for these advertisements.

Once the smartphone and the wearable can discover each other on the advertising channels, a connection is established between the smartphone and the wearable. In the present disclosure, the vehicle system described in U.S. Pat. No. 9,123,244 is extended to witness the connection event between the smartphone and the wearable, for example a smartwatch, and record: connection interval, first Communication time, channel map, access identifier, slave latency, the Bluetooth addresses (IEEE MAC) of both devices, and the types of addresses, i.e., public, resolvable, etc. This information can be used to follow BLE connections, as described above, but the present disclosure is not limited to BLE communication. All low power wireless networks use some sort of discovery and scheduling/time slotting whereby a connection can be observed and then passively followed. Each type of network or communication will vary by the medium access control (MAC) layer. As such, the vehicle system of the present disclosure can observe a connection being established and use the published MAC layer specification to then eavesdrop on the communication connection, as described above. By recording the information discussed above, the vehicle system can passively eavesdrop on the connection between the smartphone and the wearable, such as the smartwatch. Further, the wearable will most likely stop using the advertising channels at this time to reduce the power consumption.

Although the data between the smartphone and the wearable, i.e., the smartwatch, are likely to be encrypted in a way that the vehicle system, i.e., the PEPS system, is not able to use, the smartphone can use the security data described above to report to the vehicle system that the link is considered secured, that the device is a trusted device, and that the device/communication is not subject to a relay attack.

Using the link parameters and the trust status reported by the smartphone, the system is able to follow the connection and collect information about the location of the wearable proximate to the vehicle using the architecture described by the present disclosure.

BLE Sensors are typically not able to locate a portable device, such as a smartphone, wearable device, or key fob, with the same accuracy as a conventional PEPS System built using 125 kHz low frequency (LF) signals.

Figure 15:
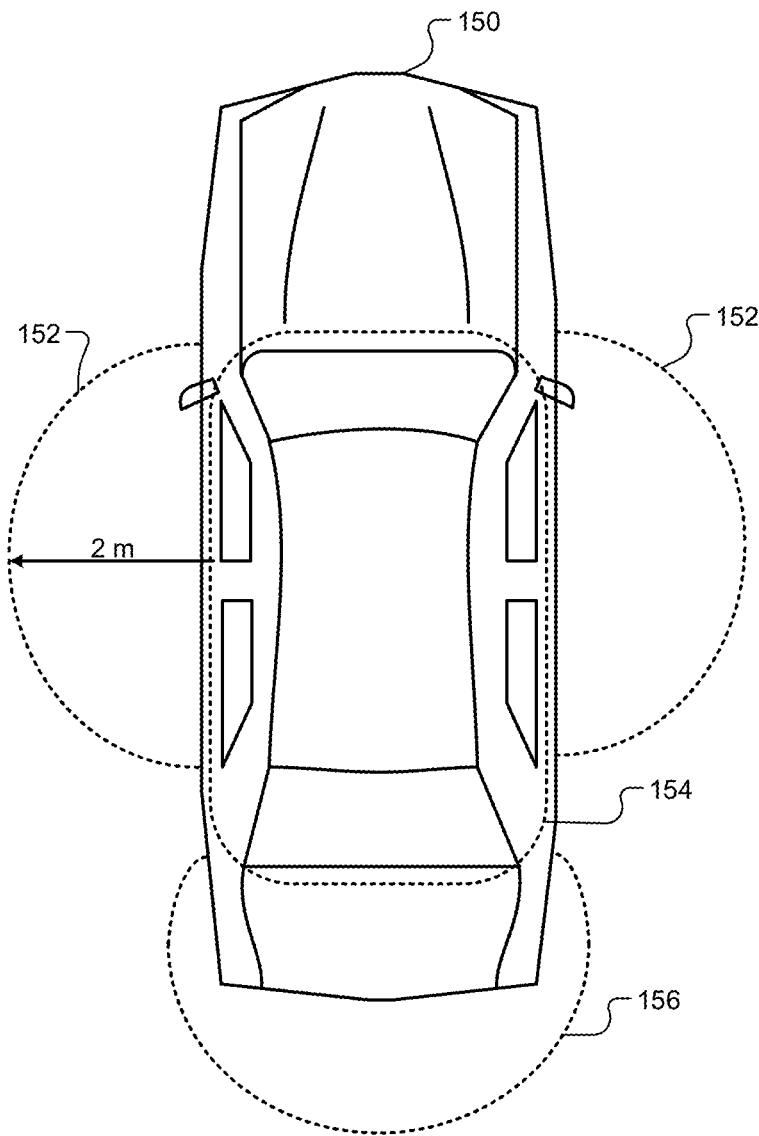
FIG. 15 illustrates a prior art PEPS system.

With reference to FIG. 15, a traditional PEPS system for a vehicle 150 is shown with requirements achieved by current production PEPS systems that use LF as the base technology for locating key fobs. For example, traditional LF PEPS systems have error rates low enough to avoid liability of incorrect decisions while also enabling the correct action in virtually every practical scenario as to avoid user frustration.

For example, a door unlock operation is allowed when the key fob is located within areas 152, which includes a radius of, for example, two meters from a door handle of the vehicle 150. While an example is provided using two meters, the distance threshold may vary from manufacturer to manufacturer and/or from region to region. For further example, a vehicle start operation is allowed when the key fob is located within area 154 of the vehicle 150, which includes the interior of the vehicle 150 with some leakage to the exterior of the vehicle 150. For example, area 154 of the vehicle 150 can be allowed to extend to about 5 cm outside of the side windows and about 15 cm on the outside of the front and rear windshields. For further example, a trunk open operation is allowed when the key fob is located within area 156 of the vehicle 150.

As compared with a conventional PEPS system built using 125 kHz LF signals, implementing a PEPS system using BLE communication utilizing the industrial, scientific and medical (ISM) radio band with 2.4 Ghz signals can present challenges. For example, a PEPS system using BLE communication and the ISM radio band with 2.4 Ghz signals must accounting for multipath, shadowing, and fading, issues, which can make PEPS systems using low cost BLE sensors measuring RSSI, for example, less accurate than the conventional systems implementing LF. The present disclosure, however, provides systems, methods, and architecture that accounts for these issues.

One issue to be addressed is that with the sensors placed on the interior of the vehicle, the measured RSSI of a signal is strong when the portable device 10 is on the interior of the vehicle, but will also measure strong when the portable devices is outside of the vehicle and a window of the vehicle. An additional issue to be addressed is that a significant shadow is created by the human body when, for example, the portable device 10 is located in a rear pants pocket of someone attempting to unlock a door of the vehicle. The human body is mostly water and is very efficient at absorbing 2.4 GHz signals. Therefore, it can be difficult to make a reliable decision about the range of the portable device 10 from the door handle of the vehicle based on the measured RSSI of a signal from the portable device 10. An RSSI threshold optimized to make sure that the portable device 10 is within two meters of the door assuming free space propagation almost certainly will not allow the PEPS system to detect the portable device 10 as being close enough to the door to allow an unlock when the signal from the portable device 10 is attenuated by the human body or subject to a severe destructive multi-path fading environment. Further, an RSSI threshold set to allow a weaker RSSI when the vehicle sensors 31 are in the shadow of the human body will almost certainly allow a portable device 10 that is more than two meters away from the door handle with a clear line of sight signal and no destructive (or even a constructive) multipath interference to the vehicle sensors 31. For the above reasons, such PEPS systems may not always meet the user's expectations, which include the liability of the PEPS system making an incorrect decision.

Figure 16:
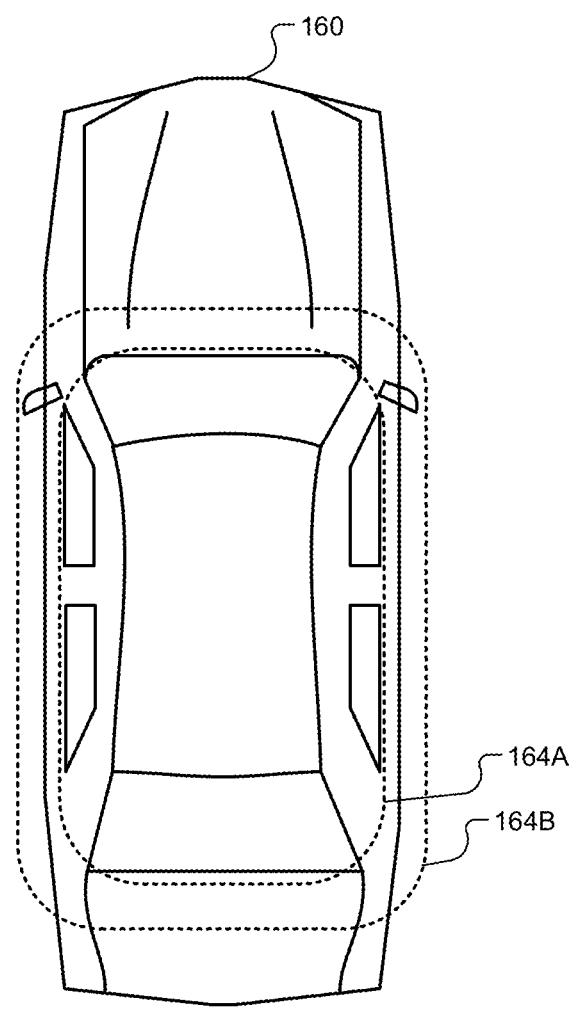
FIG. 16 illustrates a PEPS system according to the present disclosure.
Figure 17:
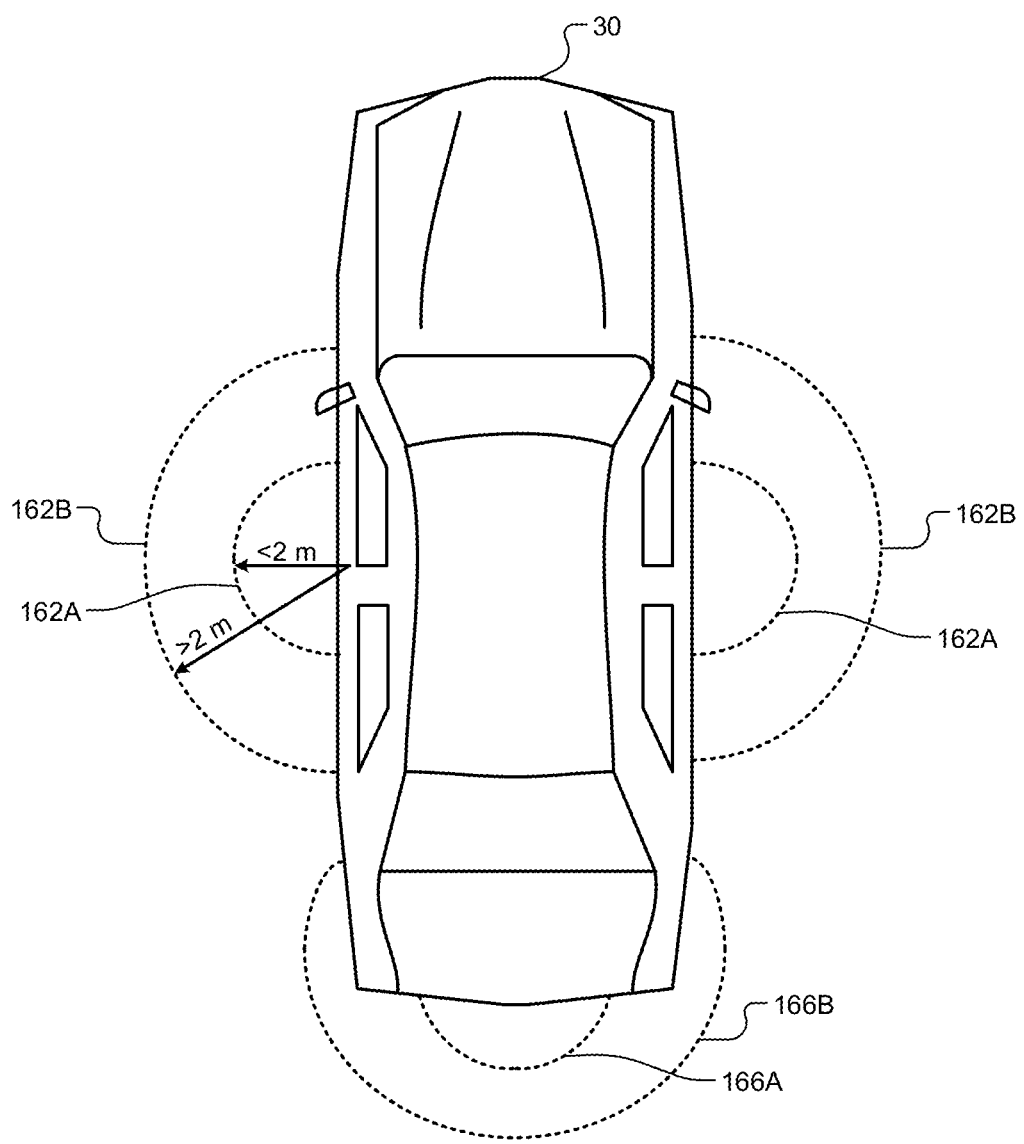
FIG. 17 illustrates a PEPS system according to the present disclosure.

With reference to FIGS. 16 and 17, a vehicle 30 with a PEPS system utilizing BLE sensors using BLE communication in the ISM radio band with 2.4 Ghz signals is shown. Due to the uncertainty of the location of the portable device 10, as discussed above, the PEPS system includes a number of different zones, including zones of uncertainty. For example, with reference to FIG. 16, the PEPS system can allow a vehicle start operation when the portable device 10 is located within the area designated 164A, while the area within area 164B and outside of area 164A can be designated as a zone of uncertainty. In other words, when the portable device 10 is located with area 164A, the PEPS system can allow a vehicle start operation. As discussed in detail below, when the portable device 10 is measured as being outside of area 164A, but inside area 164B, the portable device 10 is designated as being within a zone of uncertainty. As discussed above, the location of the portable device 10 can be measured based on, for example, the RSSI of the signals received from the portable device 10.

With reference to FIG. 17, the PEPS system can allow a door unlock operation when the portable device 10 is located within the area designated 162A, while the area within area 1628 and outside of area 162A can be designated as a zone of uncertainty. In other words, when the portable device 10 is located with area 162A, the PEPS system can allow a door unlock operation. As discussed in detail below, when the portable device 10 is measured as being outside of area 162A, but inside area 1628, the portable device 10 is designated as being within a zone of uncertainty. Further, the PEPS system can allow a trunk unlock operation when the portable device 10 is located within the area designated 166A, while the area within area 1668 and outside of area 166A can be designated as a zone of uncertainty. In other words, when the portable device 10 is located with area 166A, the PEPS system can allow a trunk unlock operation. As discussed in detail below, when the portable device 10 is measured as being outside of area 166A, but inside area 166B, the portable device 10 is designated as being within a zone of uncertainty.

The PEPS system can detect that the portable device is in one of the zones of uncertainty depicted in FIGS. 16 and 17. In such case, the portable device 10 is known to be possibly inside an authorized zone, but not with sufficient confidence to allow a correct decision to be made with appropriate confidence to minimize false positives. In such case, the PEPS system can be configured to issue an alert to the user when the actuating switch associated with the particular zone is activated.

For these reasons, a PEPS system using BLE communication may require a more educated and informed user and some acceptance of the restrictions and predefined actions to be taken by the PEPS system when the portable device is determined to be located within one of the zones of uncertainty. For example, users can be categorized into two different categories. While two categories are used for purposes of the present example, additional categories can be used with the systems, methods, and architectures of the present disclosure.

The first category of users, for example, includes users that are very concerned about security. For users in this category, the PEPS system must not make any false positive mistakes. For example, the PEPS system should not ever allow an unlock operation when the portable device 10 is more than two meters from the door handle of the vehicle 30, regardless of shadowing or the multi-path environment of the portable device 10. Users in this category must be willing to accept the limitations that the PEPS system may not be able to detect the portable device 10 when it is located in a zone of uncertainty due to attenuation of the communication signals due to shadowing or fading. In other words, these situations will ultimately result in false negatives whereby a vehicle start operation, a door unlock, or a trunk unlock operation is not allowed when the portable device is located within a zone of uncertainty.

The second category of users, for example, includes users that are more interested in convenience. For users in this category, it is acceptable that the PEPS system may make some false positives, but the PEPS system should minimize false negatives to avoid user inconvenience. For example, when there is a constructive multipath environment, the portable device 10 may be detected as strong enough to allow the door to be unlocked. Consequently, in some instances a door unlock function may be allowed despite the fact that the portable device 10 is more than a predetermined distance, such as two meters, from the door handle of the vehicle 30.

For both categories of users there can be some type of restriction or inconvenience. However, unlike a traditional PEPS systems where the key fob cannot communicate effectively with the system user, a BLE PEPS system targets the use of smart devices, such as smart phones, tablets, wearable devices, such as smartwatches, etc., as replacements to the traditional key fobs. These devices contain advanced interface systems including haptics, vibrations, audio, and screens. In addition, these devices can interface with other devices. For example, smartphones and tables can interface with smartwatches or other wearable devices that also employ the same types of interfaces and quickly accessible by a user. These devices can also accept user input, such as, for example, button presses on interfaces, voice commands, and measuring gestures, both on screen and in air using in-device motion sensors. Moreover, these devices can easily detect their own motion versus stationary status and can report their orientation as well as the screen lock out state. They can also use cameras and/or optical sensors designed to lock out the screen when someone is talking to measure the ambient background lighting.

Using the above set of expanded compatibilities, the BLE PEPS system in accordance with the systems, methods, and architecture of the present disclosure can perform a number of different actions. For example, the BLE PEPS system in accordance with the systems, methods, and architecture of the present disclosure can enable alerts to the user when a PEPS system action is performed against the vehicle, but the PEPS system does not have enough evidence to reduce the false positive rate to an acceptably low number. For example, when the driver door unlock button is pressed, and there is enough evidence to determine that some authorized device is nearby the door, but not enough evidence has been collected to reduce the false positives to a suitably low rate, an alert can be triggered to the user to confirm whether the doors should be unlocked. Additionally, when the ignition switch button is pressed, and there is enough evidence to determine that some authorized device is likely to be inside the vehicle, but not enough evidence to reduce the false positives to a suitably low rate, an alert can be triggered to the user to confirm that the vehicle should be started. In addition, other alerts can be enabled by way of the system described in U.S. Pat. No. 9,123,244, which is incorporated herein by reference. For further example, an alert can be generated if an object is left inside the vehicle and the smartphone is no longer inside the vehicle, etc.

As noted above, the PEPS system can generate a number of different types of alerts to the user, including, for example, alerts delivered to the user via the portable device 10. For example, the alerts can include a combination of one or more of: a haptic vibration; an audible sound; a phone notification in the phone's operating system, such as those used by iOS and Android; a pop-up alert on either the smartphone or an attached wearable, such as a smartwatch, and/or both. In addition, alerts can ask for confirmation of the behavior that would have been activated if a higher level of evidence was available. The alert can incorporate vehicle state, such as the door lock status or ignition status and brake pedal status.

Alerts can be targeted specifically to all devices that could reasonably be located nearby the actuating switch. For example, if there is one smartphone nearby a driver door and two smartphones by the passenger door, and the passenger door switch is pressed, the PEPS system can trigger an alert on both of the smartphones on the passenger side and can exclude the driver side smartphone from receiving the alert. Alternatively, the PEPS system can be configured such that all of the devices can receive the alert. Alternatively, a portable device 10 can be configured via an application setting to receive all alerts regardless of location of the portable device 10. Alternatively, alerts can be queued, such that if a device that needs to receive an alert via an application setting is not within communication range, the PEPS system can alert when communication with the device resumes. Alerts can also be triggered when the vehicle unlock buttons are pressed or a gesture switch (such as gesture switches to unlock a trunk) is activated, but no authorized device is nearby. Alerts can also be triggered when a device mimics some of the data from an authorized device, but cannot satisfy all the security data, such as an attempted hack by an impersonator.

A number of actions, remedies, or interventions can be taken by a user in response to an alert. For example, an alert button on a graphical user interface (GUI) can confirm a proposed action, such unlock a door, unlock a trunk, or start the vehicle. For example, when the user presses the unlock button on the door handle, an alert can be sent to the smartphone asking the user if they wish to unlock the door. The above command incorporates the door lock status because if the door is already unlocked, the question on the GUI would ask the user to confirm if the user wants to lock the door. An alert can be mapped to a particular meaning. For example, a specific haptic per a particular action, such as lock the vehicle, unlock the vehicle, start the vehicle, etc. Additionally or alternatively, a specific tone can be played on the portable device 10 for a particular action. Additionally or alternatively, a dictated via text to speech feature on the smartphone can ask "do you want to unlock the doors?" Other text could be read by the portable device 10 to confirm a proposed action.

In response to such alerts, the user can, for example, press a button on the GUI of the portable device 10 to accept the action or ignore the alert. Additionally or alternatively, a voice command can be used to accept a proposed action, by speaking, yes, no, cancel, ignore, etc. Using existing security systems in smartphone systems, such as tracking if a smartwatch has continuously been worn since a PIN has been entered, or if the smartphone is in an unlocked state, or if the smartphone can authenticate the voice. Additionally or alternatively, a user can use a programmed gesture, such as making three loops of a smartwatch, in response to receiving an alert.

Actions and alerts can be routed by the portable device 10 as appropriate. For example, if there is no wearable device present or linked to the smartphone, for example, the smartphone itself must handle the alert. On the other hand, if the user is wearing a smartwatch, it may be more appropriate to alert the user via the watch and the alert can be routed to the smartwatch. If the smartphone is unlocked, it may be more appropriate to alert on the smartphone, even though there is a smartwatch present, simply because the user is currently using the smartphone.

The PEPS system operates by waiting for or an action. For example, the PEPS system can wait for the actuating switch on a door handle to become activated or for a gesture switch, such as a gesture switch to unlock a trunk, to become activated. When the action is performed, such as pressing the button on the door handle or gesturing to activate the gesture switch, a set of evidence is collected by the communication gateway 29 and the sensors 31 about the location of the portable device 10. Based on the determined location of the portable device 10, the level of evidence indicating that position, and the user's settings regarding the user's tolerances for security and convenience, as discussed above, the PEPS system makes a determination regarding whether to carry out the operation of the vehicle feature, such as unlocking a door or a trunk of the vehicle 30 or starting the vehicle 30. The PEPS system can read the actuating switches, such as the door handles, for changes in status. When a status changes of the switch occurs, such that some action should be performed by the PEPS system, the PEPS system checks for portable devices that should receive an alert based on which devices are nearby the actuating zone and which devices have opted into receive the alert regardless of location. The PEPS system can route a message from the PEPS system via the communication gateway 29 or through a cellular data connection, such as an LTE/cloud module, to the portable device 10, such as a smartphone. The PEPS system can be configured to use BLE communication when available, and to use cellular data, such as an LTE data connection, if necessary when BLE communication is not available. The message should be encrypted and signed in such a manner to avoid eavesdropping, injection, or replay. The authorized portable device can verify the message and decide how best to alert the user and whether some remedy or intervention should be taken.

As discussed above, the PEPS system can utilize multiple levels of evidence when determining a location of a portable device 10. For example, the PEPS system can be configured with a predetermined level of evidence required to activate an alert, such as, for example, when there is enough evidence to locate the portable device 10 nearby a driver door of the vehicle 30. The PEPS system can be configured to utilize a higher standard of evidence to make a decision to allow a decision to take an action when an actuating switch is pressed for the more aggressive user that will allow some false positives. The PEPS system can be further configured to utilize an even higher standard of evidence to make a decision to allow a decision to take an action when an actuating switch is pressed for the conservative user that will reduce the false positives.

An interface to set a Device to Device (user to user) setting for acceptable level of evidence for each action criteria For instance each user can configure how they want the device they own to operate with the system. A vehicle that is owned and operated by two drivers can have one driver that wants a more secure system and the other may want a more convenient system.

Figure 18:
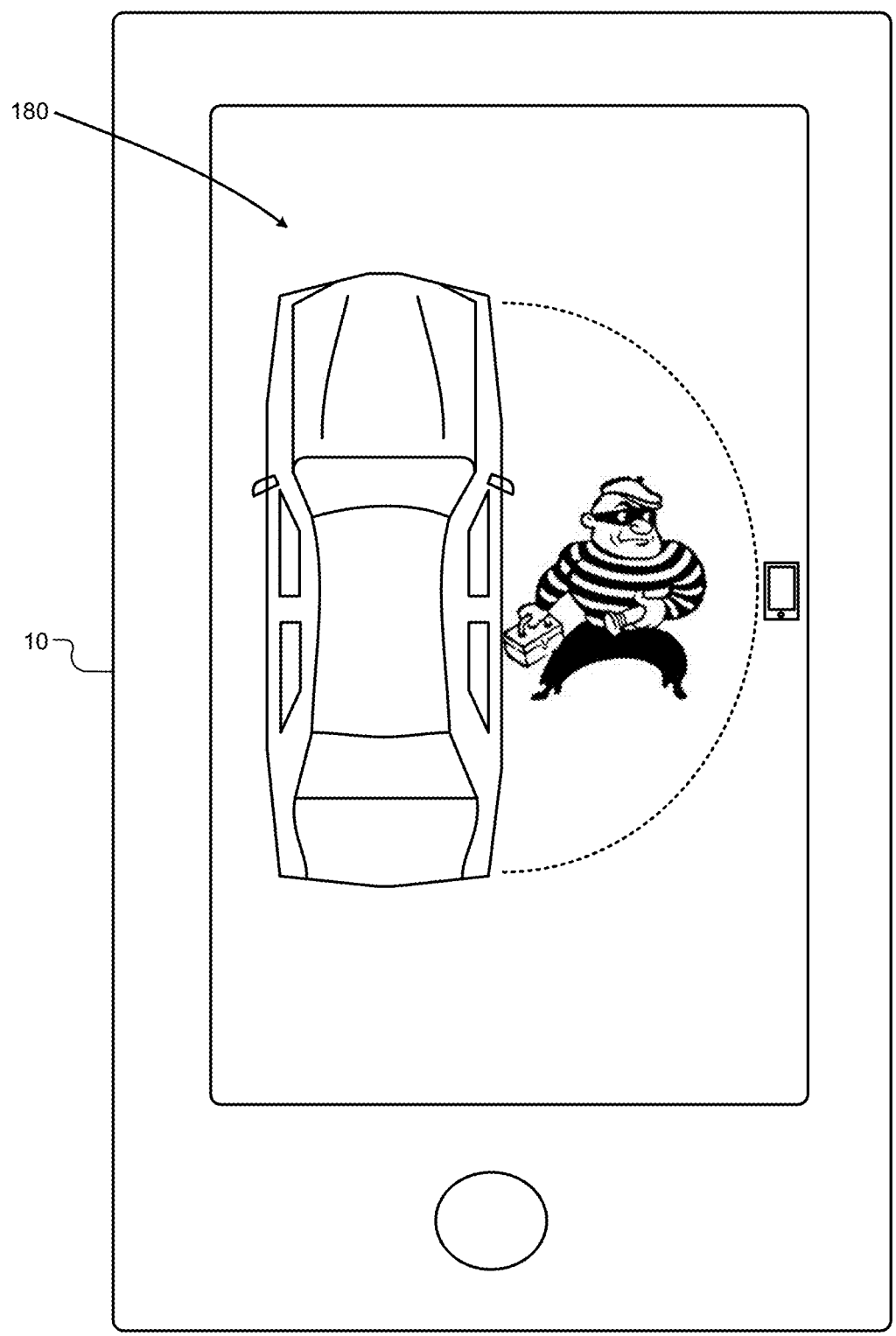
FIG. 18 illustrates a screenshot of an alert to a portable device according to the present disclosure.

The portable device 10, such as a smartphone or tablet device, can include a user interface, such as a user interface of an application running on the smartphone or tablet device, for the user to set and/or adjust the level of risk/tolerance/ evidence to be used by the PEPS system. For example, the user interface can show the user what the risks are associated with the making the system less secure by allowing more false positives. For example, the user interface can graphically provide a visual indication of where the false positives are likely to be and practically what the false positive may cause. For example, by allowing a weaker RSSI to unlock a driver door, there is a risk that the user may be standing more than three meters from the passenger door and an attacker can sneak behind the user to gain access to the vehicle. With reference to FIG. 18, this risk can be displayed, for example, on the portable device 10 using a graphical interface 180 depicting a thief gaining access to the vehicle while the user's smartphone is farther away from the vehicle than the thief.

The PEPS system can utilize programmed overrides. For example, the user may set all of the application settings according to their preference, but may still have an issue with system performance. The alert system of the PEPS system, however, can learn behavior that occurs often and bring an alert to the user asking the user if they want to program an override into the PEPS system. For example, a business person may wear a suit coat and leave a portable device 10, such as a smartphone, in the breast pocket of the suit coat. The suit coat may then be hung on a coat hanger in the rear seat, such that the portable device 10 is constantly in a zone of uncertainty for starting the vehicle. When the ignition switch is pressed, the PEPS system can realize that the ignition should be allowed, however, the PEPS system may be uncertain as to whether the user's smartphone is truly inside the vehicle. An alert can then be triggered to the smartphone, as described above, whereby the user can acknowledge that the vehicle should be started in this circumstance. But, more importantly, the decision boundary can be optionally modified to approve/accept future ignition commands when the collected evidence on the location of the smartphone looks like it does when the smartphone is in the breast pocket of the suit coat, as it is in this instance. In simple forms, there may be a multidimensional space of feature inputs and some surface that separates the points that should allow a vehicle start from those that should not, and another plane that delineates the points that should allow a door unlock operation, for example. The shape of the plane(s) can be modified so that the decision boundary can learn the correct action based on user input over time.

Because there are multiple levels of evidence used by the PEPS system, it is possible for the collected evidence on the location of a portable device 10 to conflict. In such case, the PEPS system can weigh the individual pieces of evidence to make a determination as to the location of the portable device. The PEPS system can also be configured to respond in a predetermined manner to conflicting evidence. For example, a no decision/no action/alert state can be reached when the PEPS system has conflicting evidence. For example, when the PEPS system is confused because more than one actuating state is possible based on the evidence, the PEPS system can, by default, do the safe thing and not allow any passive feature at that time and can issue an alert to the user. For further example, a conflict of evidence may arise when the portable device 10 is measured as being nearby the window lines of the vehicle and the sensors designed to unlock the vehicle are producing evidence that the portable device 10 is outside of the vehicle and nearby the door, and the sensors on the interior of the vehicle are producing evidence that the phone is on the inside of the car. When there is a conflict of evidence, the PEPS system can be configured to do the safe thing, by default, which is to not allow any passive feature and enable the action based on a user alert that the user must acknowledge/approve. The user can also override this for their device by way of a setting on the application that is shared with the PEPS system, such that either of the actions are allowed.

Before deciding to enter a no decision/no action/alert state, the PEPS system can optionally weigh the evidence between the possible outcomes and selectively enter a no decision/no action/alert state, or can pick the most likely of the possible outcomes. For example, if the unlock state has a significant margin of greater likelihood when compared to an ignition state, although both are possible, the PEPS system may decide not to enter a no decision/no action/alert state, an may instead opt to allow a vehicle door unlock operation.

The PEPS system may be configured to disable certain vehicle features or actions based on motion of the portable device 10. One of the primary risks of allowing a higher false positive rate for user convenience is the risk that the portable device 10 is further than two meters from the vehicle and someone can still cause the door to become unlocked. An alert can be used to alert the user when there is a potential attacker who enters the vehicle by alerting the user that a low confidence decision was made. Additionally or alternatively, this situation can be disabled from happening in the first place. For example, the user may have their smartphone phone in a rear pants pocket, in their hand, or in a purse where a strong signal can be received by the vehicle as they exit and walk away from the vehicle. An attacker could potentially sneak in behind the user and enter the vehicle. Because, in this scenario, the user is walking away from the vehicle and the smartphone can easily detect the walking motion. The PEPS system can incorporate an algorithm to detect if the user's smart phone is moving or not. For example, the phone can report to the PEPS system when motion is starting and when it is stopped. The vehicle lock/unlock features can be disabled for a device when the device is considered to in motion or when the measured or detected motion of the smartphone is greater than a predetermined motion threshold. This effectively reduces the above described risk. This setting can be made available to a user of the smartphone via an application setting. The user can be encouraged, for example, to enable this setting if they have configured the system to allow false positives in this region.

The present disclosure includes a BLE localization system that allows secure authorization of vehicle features. The BLE localization system includes a portable device, also referred to as a nomadic device, and a vehicle. The BLE localization system further includes a plurality of BLE passive eavesdropping sensors configured to accept frequency hopping spread spectrum connection information securely from a communication gateway, also referred to as a central controller, and to report measured values securely back to the central controller. The communication gateway or central controller is capable of secure BLE communications with the portable or nomadic device and is configured to provide connection information about a communication connection with portable or nomadic devices to the passive eavesdropping sensors and to collect data from eavesdropping sensors. The communication gateway or central controller can share communication information with each of the passive eavesdropping sensors necessary for the passive eavesdropping sensors to passively follow the communication between the communication gateway or central controller and the portable or nomadic device. Each of the eavesdropping sensors is configured to, upon receipt of the connection information from the communication gateway or central controller, find the next scheduled communication between the communication gateway or central controller and the portable or nomadic device and to synchronize its internal timing and communication channel map to observe and measure all subsequent communications between the communication gateway or central controller and the portable or nomadic device. The communication gateway or central controller can be configured to communicate the vehicle's location in latitude, longitude, and error of location measurement to the portable or nomadic device. The portable or nomadic device can estimate the distance or range to the vehicle or the vehicle's PEPS system using location based services available to the portable or nomadic device, such as a smartphone, and can compare this to the location reported by the vehicle.

The present disclosure also includes a BLE localization system that allows secure authorization of vehicle features comprising a portable or nomadic device and a vehicle. The BLE localization system includes a plurality of sensors configured to measure the signal characteristics of communication from the portable or nomadic device and a communication gateway or central controller capable of providing information about the expected interval and timing of communication from the portable or nomadic device. The BLE localization system also includes a security filtering module configured to process a time series of samples purported to be from the portable or nomadic device. The security filtering module can compare the time series against known communication properties. The security filtering module can compare whether there is more communication data sampled from the portable or nomadic device within a given timeframe than what could be produced by the portable or nomadic device alone. In this way, the security filtering module can determine whether the physical layer protocol was violated. The security filtering module can determine whether the variance of data purportedly sampled from the portable or nomadic device within a given time window is beyond what is expected for all of the data originating from the portable or nomadic device. The comparison is a bounded comparison where the variance may be too large as if there is more than one device in a different location or a single device driving too consistent of measurements into the system. The security filtering module can count the number of outliers beyond a configurable threshold of absolute value within a given time window and compares the count to a configurable calibration. The security filtering module can count the number of outliers that are beyond a configurable threshold of standard deviation beyond the data set mean within a given time window and compares it to a configurable calibration. The sensors can be configured to report partial reception of corrupted data packets to the security filtering module. The sensors can receive timing information from the system allowing each sensor to report a time stamp for each received packet. The security filtering module can search for received packets that are either too early or too late, according to configurable thresholds. The security filtering module can compare the similarity of timing of a packet that was received by the plurality of sensors to determine whether any sensor received the data earlier than nominal by a configurable value or later than nominal by a configurable value, thereby judging whether the sensor measured the same RF energy as expected. The security filtering module can compare the reported signal strengths reported from the plurality of sensors, when a sensor value from any particular sensor (authorizing sensor) would cause the system to enable authorized access to a feature. The values reported values from the remaining sensors can be used to validate that they are receiving a value consistent with a device within region purported by the measurement of the authorizing sensor.

The sensors can be configured to only report measurements with data matching a particular format. For instance, the packets can be filtered so that only BLE attribute write requests with data longer than a predetermined number of bytes are measured. In such case, packets pertaining to simple link maintenance could be discarded or no measurements could be taken on data that is not encrypted. The sensors can be configured to report a cryptographic hash of the data contained in the packets or a collection of packets that is measured to the security filtering module.

The communication gateway can be configured to share with the security filtering module the data that was transmitted between the portable or nomadic device and the communication gateway in either raw format or in a cryptographic hash of one or more packets. The security filtering module can be configured to inspect the data or cryptographic hash data from the plurality of sensors and compare the reported data or cryptographic hash of data received from the communication gateway, enabling the security filtering module to verify that each sensor received the same data and that the data matches the data received by the communication gateway. The security filtering module is configured to report cleaned data to a decision making module. If any of the security rules are not satisfied, the security filtering module can report to the decision making module that the system has been determined to be under attack. The decision making module is configured to optionally send an alerting message to an authorized portable or nomadic device through the authenticated BLE communication link. The application software on the portable or nomadic device is optionally configured to bring about an alert to the user of the device through one of the device's alerting mechanisms.

The present disclosure includes one or more sensors capable of accepting commands to receive BLE physical layer packets regardless of an absence of errors, such as CRC errors, on any of the forty BLE channels at a configurable future time or for a configurable time duration.

The present disclosure also includes a sensor network whereby each sensor is configured to search on different BLE channels at differing times and to report the received data to a security module for later processing.

The present disclosure also includes a method by which the security module compares the data that is being received from the portable device connected to the communication gateway, which is purportedly the authorized portable device, with a log of data read by and produced from the sensor network.

The present disclosure includes a comparison method that looks for a device address within the recorded packets that is equivalent to the address of the authorized portable device. The present disclosure also includes a comparison method that extracts data contained within the recorded packets and compares it to data that is being received or has already been received by the PEPS system. If there is a match, the security module is able to judge that a man-in-the-middle attack is occurring.

The present disclosure includes a method that takes a time series of received messages that originated from the portable or nomadic device and reproduces the connection interval, current channel, connection interval, slave latency and channel map, required for sensors in the sensor network to start following the connection.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

In this application, including the definitions below, the terms "module" and "system" may refer to, be part of, or include circuits or circuitry that may include processor hardware (shared, dedicated, or group) that executes code and memory hardware (shared, dedicated, or group) that stores code executed by the processor hardware. The code is configured to provide the features of the modules and systems described herein. In addition, in this application the terms "module" and "system" may be replaced with the term "circuit." The term "memory hardware" may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as JavaScript Object Notation (JSON), hypertext markup language (HTML) or extensible markup language (XML), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A system comprising:
   a communication gateway in a vehicle configured to establish a wireless communication link with a portable device;
   a plurality of sensors in communication with the communication gateway, each configured to receive connection information about the wireless communication link, to receive communication packets sent from the portable device to the communication gateway via the wireless communication link, and to measure signal information of communication signals transmitting the communication packets;
   a localization module configured to receive the signal information from each of the plurality of sensors and to determine a location of the portable device based on the signal information from the plurality of sensors;
   a passive entry/passive start (PEPS) system configured to receive the location of the portable device from the localization module and to perform a vehicle function including at least one of unlocking a door of the vehicle, unlocking a trunk of the vehicle, and allowing the vehicle to be started based on the location of the portable device; and a security module configured to compare first data in the communication packets received by the communication gateway with second data in the communication packets received by the plurality of sensors.

2. The system of claim 1, wherein the security module is further configured to generate an alert to the portable device when the first data does not match the second data.

3. The system of claim 2, wherein the alert indicates that the PEPS system is being attacked.

4. The system of claim 1, wherein the wireless communication link is a Bluetooth low energy (BLE) communication link.

5. The system of claim 1, wherein the signal information includes at least one of a received signal strength, a time of arrival, a time difference of arrival, and an angle of arrival of the communication signals transmitting the communication packets.

6. The system of claim 1, wherein the connection information includes at least one of a channel map, a channel hop interval, a slave latency, a next channel, a next channel time, a clock accuracy, filtering data, channel pre-scan parameters, channel post-scan parameters, and connection monitoring parameters of the wireless communication link.

7. The system of claim 1, wherein the PEPS system is further configured to receive motion data from the portable device indicating detected motion of the portable device, to compare the motion data with a predetermined threshold, and to disable the vehicle function when the motion data is greater than the predetermined threshold.

8. The system of claim 1, wherein the wireless communication link is a secure wireless communication link.

9. The system of claim 1, further comprising a vehicle module that includes the communication gateway and the security module.

10. A system comprising:
a communication gateway in a vehicle configured to establish a wireless communication link with a portable device;
a plurality of sensors in communication with the communication gateway, each configured to receive connection information about the wireless communication link, to receive communication packets sent from the portable device to the communication gateway via the wireless communication link, and to measure signal information of communication signals transmitting the communication packets;
a localization module configured to receive the signal information from each of the plurality of sensors and to determine a location of the portable device based on the signal information from the plurality of sensors;
a passive entry/passive start (PEPS) system configured to receive the location of the portable device from the localization module and to perform a vehicle function including at least one of unlocking a door of the vehicle, unlocking a trunk of the vehicle, and allowing the vehicle to be started based on the location of the portable device; and
a security module configured to compare an arrival time of a received communication packet with an expected arrival time for the received communication packet and to determine whether the received communication packet was sent by an unauthorized device based on the comparison.

11. The system of claim 10, wherein the security module is further configured to generate an alert to the portable device in response to the received communication packet being sent by the unauthorized device.

12. The system of claim 11, wherein the alert indicates that the PEPS system is being attacked.

13. The system of claim 11, wherein the security module is further configured to determine a difference between the arrival time of the received communication packet and the expected arrival time, compare the difference with a predetermined threshold, and generate the alert in response to the difference being greater than the predetermined threshold.

14. The system of claim 10, wherein the wireless communication link is a Bluetooth low energy (BLE) communication link.

15. The system of claim 10, wherein the signal information includes at least one of a received signal strength, a time of arrival, a time difference of arrival, and an angle of arrival of the communication signals transmitting the communication packets.

16. The system of claim 10, wherein the connection information includes at least one of a channel map, a channel hop interval, a slave latency, a next channel, a next channel time, a clock accuracy, filtering data, channel pre-scan parameters, channel post-scan parameters, and connection monitoring parameters of the wireless communication link.

17. The system of claim 10, wherein the PEPS system is further configured to receive motion data from the portable device indicating detected motion of the portable device, to compare the motion data with a predetermined threshold, and to disable the vehicle function when the motion data is greater than the predetermined threshold.

18. The system of claim 10, wherein the wireless communication link is a secure wireless communication link.

19. The system of claim 10, further comprising a vehicle module that includes the communication gateway and the security module.

20. A method comprising:
establishing, with a communication gateway in a vehicle, a wireless communication link with a portable device;
receiving, with a plurality of sensors in communication with the communication gateway, connection information about the wireless communication link;
receiving, with the plurality of sensors, communication packets sent from the portable device to the communication gateway via the wireless communication link;
measuring, with the plurality of sensors, signal information of communication signals transmitting the communication packets;
receiving, with a localization module, the signal information from each of the plurality of sensors;
determining, with the localization module, a location of the portable device based on the signal information from the plurality of sensors;
receiving, with a passive entry/passive start (PEPS) system, the location of the portable device from the localization module;
performing, with the PEPS system, a vehicle function including at least one of unlocking a door of the vehicle, unlocking a trunk of the vehicle, and allowing the vehicle to be started based on the location of the portable device; and
comparing, with a security module, first data in the communication packets received by the communication gateway with second data in the communication packets received by the plurality of sensors.

21. The method of claim 20, further comprising generating, with the security module, an alert to the portable device when the first data does not match the second data.

22. The method of claim 21, wherein the alert indicates that the PEPS system is being attacked.

23. The method of claim 20, wherein the wireless communication link is a Bluetooth low energy (BLE) communication link.

24. The method of claim 20, wherein the signal information includes at least one of a received signal strength, a time of arrival, a time difference of arrival, and an angle of arrival of the communication signals transmitting the communication packets.

25. The method of claim 20, wherein the connection information includes at least one of a channel map, a channel hop interval, a slave latency, a next channel, a next channel time, a clock accuracy, filtering data, channel pre-scan parameters, channel post-scan parameters, and connection monitoring parameters of the wireless communication link.

26. The method of claim 20, further comprising:
 receiving, with the PEPS system, motion data from the portable device indicating detected motion of the portable device;
 comparing, with the PEPS system, the motion data with a predetermined threshold; and
 disabling, with the PEPS system, the vehicle function when the motion data is greater than the predetermined threshold.

27. The method of claim 20, wherein the wireless communication link is a secure wireless communication link.

28. The method of claim 20, wherein the communication gateway and the security module are included in a vehicle module in the vehicle.

* * * * *